United States Patent
Pinno-Rath et al.

(10) Patent No.: US 11,022,786 B2
(45) Date of Patent: Jun. 1, 2021

(54) HANDLING DEVICE FOR HANDLING A MEASURING PROBE

(71) Applicant: Anton Paar GmbH, Graz (AT)

(72) Inventors: Norbert Pinno-Rath, Graz (AT); Gernot Leuprecht, St. Radegund bei Graz (AT); Daniel Koller, Graz (AT)

(73) Assignee: Anton Paar GmbH, Graz (AT)

( * ) Notice: Subject to any disclaimer, the term of this patent is extended or adjusted under 35 U.S.C. 154(b) by 0 days.

(21) Appl. No.: 16/646,844

(22) PCT Filed: Sep. 13, 2018

(86) PCT No.: PCT/EP2018/074795
§ 371 (c)(1),
(2) Date: Mar. 12, 2020

(87) PCT Pub. No.: WO2019/053153
PCT Pub. Date: Mar. 21, 2019

(65) Prior Publication Data
US 2020/0326518 A1 Oct. 15, 2020

(30) Foreign Application Priority Data
Sep. 13, 2017 (AT) .................. A50765/2017

(51) Int. Cl.
*G02B 21/00* (2006.01)
*G01Q 60/16* (2010.01)
(Continued)

(52) U.S. Cl.
CPC ........... *G02B 21/002* (2013.01); *G01Q 60/16* (2013.01); *G01Q 60/38* (2013.01); *G01Q 70/02* (2013.01)

(58) Field of Classification Search
CPC ...... G02B 21/002; G01Q 60/38; G01Q 60/16; G01Q 70/02
(Continued)

(56) References Cited

U.S. PATENT DOCUMENTS 5,376,790 A   12/1994   Linker et al.
5,705,814 A * 1/1998   Young .................... G01Q 30/06
                                              250/307

(Continued)

FOREIGN PATENT DOCUMENTS

AT          517809 A1      4/2017
DE   10 2015 210159 A1    12/2016
(Continued)

OTHER PUBLICATIONS

SPM-9700HT Scanning Probe Microscope | Cantilever Mounting Jig, Global Analytical Measuring Instruments, Shimadzu Corporation, as captured on Mar. 18, 2020; pp. 1-3; https://www.shimadzu.com/an/surface/spm/spm9700-7.html.

(Continued)

*Primary Examiner* — Thai Q Tran
*Assistant Examiner* — Stephen R Smith
(74) *Attorney, Agent, or Firm* — Robert A. Blaha; Smith Tempel Blaha LLC

(57) ABSTRACT

A handling apparatus for handling a measuring probe of a scanning probe microscope is disclosed. The measuring probe has a probe body and a probe tip which is coupled with the probe body by a cantilever. The handling apparatus includes a receiving device for receiving the measuring probe at a receiving area, a guide structure, in which the measuring probe is guidable while at the same time the probe body is at least partially limited and the cantilever and the probe tip are supported without contact, and a transport (Continued)

device for transporting the measuring probe from the receiving area along the guide structure to a target area.

20 Claims, 13 Drawing Sheets

(51) Int. Cl.
*G01Q 60/38* (2010.01)
*G01Q 70/02* (2010.01)

(58) Field of Classification Search
USPC .......... 348/79; 850/1, 2, 8, 17, 18, 48, 53; 250/306; 73/105
See application file for complete search history.

(56) References Cited

U.S. PATENT DOCUMENTS

| | | | |
|---|---|---|---|
| 5,756,887 A | 5/1998 | Bryson, III et al. | |
| 6,093,930 A * | 7/2000 | Boyette, Jr. | G01Q 70/02 250/442.11 |
| 6,127,832 A | 10/2000 | Comulada, Jr. et al. | |
| 6,435,015 B1 | 8/2002 | Yamamoto | |
| 7,709,791 B2 | 5/2010 | Jo et al. | |
| 9,372,203 B1 * | 6/2016 | Massie | G01Q 70/02 |
| 2003/0007242 A1 | 1/2003 | Schwartz | |
| 2007/0180889 A1 * | 8/2007 | Murayama | G01Q 10/06 73/1.79 |
| 2008/0018993 A1 * | 1/2008 | Sulzbach | G01Q 70/02 359/368 |
| 2008/0149829 A1 | 6/2008 | Jo et al. | |
| 2009/0107266 A1 | 4/2009 | Tella et al. | |
| 2010/0037360 A1 | 2/2010 | Jo et al. | |
| 2016/0187376 A1 * | 6/2016 | Humphris | G01Q 70/02 850/18 |
| 2016/0245844 A1 | 8/2016 | Kokawa | |
| 2017/0067935 A1 * | 3/2017 | Gomez-Casado | G01Q 70/02 |
| 2018/0095108 A1 * | 4/2018 | Baur | G01Q 70/02 |
| 2019/0317127 A1 * | 10/2019 | Sadeghian Marnani | G01Q 70/02 |

FOREIGN PATENT DOCUMENTS

| | | |
|---|---|---|
| DE | 10 2016 115057 A1 | 2/2017 |
| EP | 0 444 697 A2 | 9/1991 |
| EP | 0 564 088 A1 | 10/1993 |
| EP | 1 662 246 A1 | 5/2006 |
| JP | 05133738 A * | 5/1993 |
| JP | H05 133738 A | 5/1993 |
| JP | 2000249714 A | 9/2000 |
| WO | 9318525 A1 | 9/1993 |
| WO | 9708733 A1 | 3/1997 |

OTHER PUBLICATIONS

Scanning Probe Microscope AFM5500M, Hitachi Group Products & Services, Hitachi High-Tech Corporation, as captured on Mar. 18, 2020; pp. 1-5; https://hitachi-hightech.com/global/product_detail/?pn=em-afm5500m.

NT-MDT Spectrum Instruments, Titanium Revolution Cartridge Flyer, as captured on Mar. 18, 2020; pp. 1-2; https://wsww.ntmdt-si.com/data/media/files/products/titanium/revolution_cartridge_flyer.pdf.

* cited by examiner

HANDLING DEVICE FOR HANDLING A MEASURING PROBE

CROSS-REFERENCE TO RELATED APPLICATION

This application claims the benefit of the filing date of the Austrian Patent Application No. A 50765/2017, filed Sep. 13, 2017, the disclosure of which is hereby incorporated herein by reference.

TECHNICAL FIELD

The present invention relates to a handling apparatus and a method for handling a measuring probe, as well as an arrangement with a handling apparatus and a scanning probe microscope.

TECHNOLOGICAL BACKGROUND

A scanning probe microscope mainly serves the purpose of a lateral or vertical high-definition analysis of surfaces (in particular topographical analyses of surfaces). A measuring probe (for example comprising a leaf spring, which is also named cantilever) with a nanoscale small needle (also named measuring tip or probe tip) is lead over a surface (i.e. lead in a scanning manner) and the displacement of the cantilever, based on the interaction of the cantilever and the surface, is detected.

Depending on the surface properties of the sample, the displacement of the cantilever, dependent on the position, or the tracing of the probe, is being recorded or scanned. The displacement of the cantilever or the of the probe tip can be measured capacitively or piezo electrically or by means of optical sensors. This method allows for a structural analysis of the surface of the probe to the point of atomic resolution.

The cantilever used for the measurement together with the probe tip or measuring tip are mounted on the cantilever chip, which is typically a few $mm^2$ in size. This probe body again, before the measurement with the scanning probe microscope, has to be inserted into a cavity at a probe carrier designed therefor.

Most of the times, this action is carried out manually and sets high demands on the user, so that a damage or a loss of the cantilever or the probe tip are avoided.

Conventionally, manual methods are used by which the probe body is inserted with tweezers into an opened tipping mechanism, which is closed thereafter. This demands experience and skill on the part of the user.

To facilitate the mounting for the user, in alternative solutions the cantilever comprising the probe tip, together with the probe body, are pre-mounted onto a carrier, which facilitates handling and mounting (the now bigger component). However, prefabricated modules of that kind are instrumentally elaborate. Besides, such a module does not provide enough flexibility in changing a measuring probe and necessitates a high logistic effort, because a higher number of modules have to be kept in spare. The difficulty in mounting the measuring probe is just preponed.

It is conventionally still a challenge to handle a sensitive measuring probe of a scanning probe microscope and to change it on demand without demanding a high degree of skill from the user and without being posed to the threat of damaging or destroying the measuring probe.

SUMMARY

There may be a need for providing a way of being able to handle a measuring probe of a scanning probe microscope in a simple and damage protected manner.

This need may be met by the subject matter according to the independent claims. Further embodiments are described by the dependent claims.

According to one embodiment of the present invention, a handling apparatus for handling a measuring probe of a scanning probe microscope is provided, wherein the measuring probe comprises a probe body and probe tip, which is coupled with the probe body by means of a cantilever, wherein the handling apparatus comprises a receiving device for receiving the measuring probe at a receiving area, a guide structure, in which the measuring probe is guidable while at the same time the probe body is at least partially limited and the cantilever and the probe tip are mounted without contact, and a transport device for transporting the measuring probe from the receiving area along the guide structure to a target area (in particular in a region of the target area).

According to another embodiment of the present invention, there is provided an arrangement which comprises a scanning probe microscope for determining surface information regarding a sample body by means of sensing in a scanning manner a surface of the sample body, wherein the scanning probe microscope comprises a measuring probe which is configured for sensing the surface of the sample body in a scanning manner and a probe body, and a probe tip which is coupled with the probe body by means of a cantilever, and which comprises a handling apparatus with the features described above for handling the measuring probe.

According to another exemplary embodiment, a method for handling a measuring probe for a scanning probe microscope is provided, wherein the measuring probe comprises a probe body and a probe tip which is coupled with the probe body by means of a cantilever, wherein in the method the measuring probe is received at a receiving area of the handling apparatus, the measuring probe is led in the handling apparatus in such a way, that the probe body is limited at least partially by a guide structure and the cantilever and the probe tip are mounted in the guide structure without contact, and the measuring probe is transported in the handling apparatus from the receiving area along the guide structure to the target area.

Overview of Embodiments

Within the scope of the present application, the term "handling apparatus" is to be understood in particular as a tool or an auxiliary gadget, with which a measuring probe with a sensitive probe tip can be handled by a user and which facilitates mounting the measuring probe at a probe reception of a scanning probe microscope before an actual analysis of a probe body by means of the scanning probe microscope. The handling apparatus may be provided separately from the scanning probe microscope. Alternatively, the handling apparatus may be firmly attached to the scanning probe microscope.

Within the scope of the present application, the term "scanning probe microscope" is to be understood in particular as a microscope, where an image or other surface information of a sample body is not created by optical or electron-optical imaging (i.e. using lenses), but by interaction between a measuring probe and the sample body. The sample surface that is to be analyzed is sensed by this measuring probe point by point in a scanning process. The measured values that result from each point can then either be combined into an image or be analyzed in another way.

According to an exemplary embodiment of the invention, a handling apparatus, which is designed as a tool, is provided, which enables a user to prepare a measuring probe with a sensitive probe tip for mounting on a scanning probe microscope. During an according handling of the measuring probe by the user, by using the handling apparatus, the sensitive probe tip is continuously and reliably protected from damage. At the same time, no filigree handles or special experience or dexterity are required from a user. Rather, it is sufficient if a user merely rests the measuring probe, together with the probe tip, on a receiving area and then actuates the handling apparatus, whereby the rested measuring probe is transported in a self-actuating manner from the receiving area along the guide structure to a target area. While covering the distance, the probe tip remains contactless in the handling apparatus, wherein for moving the measuring probe an according transport device engages at the less sensitive probe body. Having arrived in the desired manner at the target area or in the region of the target area, the measuring probe that has been prepared for coupling to the scanning probe microscope can be further treated by extraction of a transport module comprising the target area out of the handling apparatus. Transport module, together with the measuring probe at the target area, can then be transferred to the scanning probe microscope, where the mounting of the transport module together with the measuring probe at the scanning probe microscope can be finished. In that manner, a handling mechanism is provided which is operable intuitively and without previous knowledge or dexterity, and which can be operated by an untrained user and which reliably prevents damage of the cantilever and of the probe tip at the probe body of the measuring probe.

In the following, additional exemplary embodiments of the handling apparatus, the arrangement and the method will be described.

According to an embodiment of the invention, the handling apparatus may comprise a cover device for placing on the receiving device for covering the measuring probe. Such a cover device may comprise a lid, which also protects the measuring probe from damage on the top or laterally if necessary. When a user has placed the measuring probe at the receiving area and put on the cover device, no further user interaction is directly necessary to mount it at the scanning probe microscope.

According to an embodiment of the invention, the guide structure may comprise a channel at least in sections between the receiving area and the target area, along which channel the measuring probe is guidable. Such a channel may be delimited as a notch, as a recess or by lateral walls and may define the trajectory precisely, along which the measuring probe moves from the receiving area to the target area during transport. Thereby, the probe tip may also be handled quickly, reliably and safely.

According to an embodiment of the invention, the channel may be delimited by top and/or bottom and/or lateral walls. In one embodiment of a channel which is spatially delimited at four sides, the probe tip is fully and thus particularly reliably protected against undesirable mechanical damage.

According to an embodiment of the invention, the wall that is facing the probe tip may comprise an exemption for releasing the cantilever and the probe tip in a contactless manner. The measuring probe may be guided in the guide structure in such a way, that the probe tip, which is for example pointing upwards, is, at the cantilever end, always spaced apart from the surrounding walls due to the exemption and is therefore always lead in a contactless manner during transporting.

According to an embodiment of the invention, the transport device may be formed for transporting the measuring probe from the target area along the guide structure back to the receiving area. Guide structure and transport device may thus be configured in such a way that not just a transfer of the measuring probe from the receiving area to the target area for the purpose of mounting the probe body to the scanning probe microscope is enabled, but that also after completion of a measurement using the measuring probe at the scanning probe microscope, the measuring probe as well may be demounted by a user without complicated handling. This may be carried out in that after completion of such a measurement, the transport module, together with the measuring probe, is transferred from the scanning probe microscope back to the handling apparatus, is coupled there, and the measuring probe may be transported back in an inverse direction from the target area along the guide structure to the receiving area. By means of such a bidirectional handleability, a user simply has to extract the measuring probe from receiving area in the end.

According to an embodiment of the invention, the transport device may comprise a feeding pusher for pushing the measuring probe at least in sections from the receiving area to the target area. Descriptively speaking, using the feeding pusher, the whole measuring probe may be pushed from behind along the guide structure to the target area. Therefore, a single intuitive movement of the hand of a user is sufficient to transport the measuring probe from the receiving area to the target area or to the region of the target area.

According to an embodiment of the invention, the feeding pusher may comprise an exemption for releasing the cantilever and the probe tip in a contactless manner, when the measuring probe is pushed by means of the feeding pusher at least in sections. For protecting the measuring probe from mechanical impairment in particularly reliable manner, it may be inserted in such a way, that during transport from the receiving area to the target area the cantilever, together with the probe tip, lies at a position which is on the rear side with regard to the transport direction. While the feeding pusher pushes the measuring probe in a forward direction and thereby engages at the rear side of the measuring probe (with regard to the transport direction), the described exemption ensures that the cantilever, together with the probe tip, does not come into contact with the surrounding components of the handling apparatus despite the handling of the whole measuring probe by the feeding pusher, and is even additionally protected by the feeding pusher during transport.

According to an embodiment of the invention the transport device may comprise a discharge pusher for pushing the measuring probe at least in sections from the target area back to the receiving area. During the return transport of the measuring probe from the target area to the receiving area the measuring probe may be transported in an inverse direction, compared to the forward transport, and may thereby be pushed or dragged by means of the discharge pusher. During forward transport, the discharge pusher may serve as frontal limitation of the measuring probe, whereas during return transport, the feeding pusher functions as rear sided limitation of the measuring probe. Thus, feeding pusher and discharge pusher both fulfill a double function, namely pushing the measuring probe in the one operational state, and spatially limiting the measuring probe in the respective other operational state.

According to an embodiment of the invention, the discharge pusher may be formed for merely engaging the probe body in a contact-based manner, when by means of the discharge pusher the measuring probe is pushed from the target area back to the receiving area. Advantageously, pushing the measuring probe by means of the discharge pusher leads to no mechanical stress of the cantilever, together with the probe tip, because the discharge pusher merely attacks at the probe body, according to the described embodiment.

According to an embodiment of the invention, the discharge pusher may be formed as a spring tongue. Such a spring tongue may be an elastic component or solid-state joint, that may ensure a handling of the probe body with just little force. Thus, also the design of the discharge pusher contributes to disabling mechanical damage or destruction of the measuring probe during handling.

According to an embodiment of the invention, the discharge pusher may comprise a hook, which acts on the measuring probe during the pushing, and a release nose, which is coupled with the hook and which sinks into a recess upon pushing, which nose is guided out of the recess as a result of the pushing when the receiving area is reached by the measuring probe, whereby the hook releases the measuring probe. A discharge pusher, preferably formed as spring tongue, may thus comprise a hook for taking the probe body, when the handling apparatus is being operated for transporting the measuring prove from the target area back to the receiving area. Advantageously, a spring tongue may, according to an exemplary embodiment and in addition to the hook, comprise a release nose which is for example arranged in front of it, which release nose may for example be guided in a notch or another recession, while the hook pushes or pulls the measuring probe back into the direction of the receiving area. By means of an appropriate configuration of the recess, the hook may be forced into an upward movement, when the measuring probe has arrived in the region of the desired end position, therefore at the receiving area. The release nose and the hook may be interconnected in such a way, that upon a movement of the release nose out of the recess also the hook is moved upwards and thus becomes disengaged from the measuring probe. The measuring probe is then not pushed or dragged any further and remains at the desired end position, for example at the receiving area.

According to an embodiment of the invention, perpendicular to a pushing direction, the discharge pusher may be formed narrower than the feeding pusher. By means of this particularly narrow design of the discharge pusher, the guidance of the release nose in the notch or another recess may on the one hand be enabled in a space saving manner and on the other hand with a precisely defined spatial guidance.

According to an embodiment of the invention, the handling apparatus may comprise an actuating device for actuating the transport device by an operator. For example, such an actuating device may first be actuated by a user (for example by pressing a button) before the transport device is moved longitudinally, whereby the measuring probe is automatically driven between the receiving area and the target area. Such an actuating device is operable by a user intuitively and in an error robust manner. Alternatively, or additionally, the actuating device may be formed for actuating by means of a driving device, in particular a motor.

According to an embodiment of the invention, the actuating may comprise a force limitation mechanism for limiting a force being exertable by a user to the actuating device in such a way that a force being exerted on the transport device does not exceed a pre-definable threshold value. Advantageously, a precaution measure may be taken at the actuating device, which limits the transmission of the force being exerted by a user onto the measuring probe to a pre-definable maximum value. Thus, even upon exertion of an excessive force by a user, it may reliably be excluded that the measuring probe is affected thereby. An according force limitation mechanism may for example cause a force decoupling between actuating device and measuring probe, when the actuating fore exceeds a pre-definable threshold value. This may be accomplished by providing an according coupling between actuating device and transport device.

According to an embodiment of the invention, the actuating device may be formed in such a way, that a shifting of the transport device by actuating the actuating device can selectively be enabled or disabled. For example, the actuating device may be transformed between a locked state and an unlocked state, as a user actuates the actuating device accordingly (for example having to actuate a button before a push movement). Even in an unlocked state, a shift of the transport device may be disabled by a safety mechanism, if upon such a shift damage to the measuring probe could be feared. An example of an according safety mechanism is depicted in FIG. 16.

According to an embodiment of the invention, the handling apparatus may comprise a transport module comprising the target area, which transport module, in particular together with a measuring probe at the target area, is separable from the rest of the handling apparatus and transportable to the scanning probe microscope or couplable there. The transport module may selectively be fixed to the handling apparatus or to the scanning probe microscope. When the transport module is fixed to the handling apparatus, transferring the measuring probe between receiving area and target area may be carried out. When the transport module is fixed to the scanning probe microscope, the measuring probe may be applied for sensing in a scanning manner a surface of a sample body. The transport module itself may carry the measuring probe at its target area and may, as it is substantially larger in dimensions than the measuring probe, be handled by a user without any problems.

According to an embodiment of the invention, the handling apparatus may comprise a movable (for example shiftable) ramp and a movable (for example pivotable) guide component, which, in an operational state, are movable towards the transport module for engaging the transport module. In another operational state, guide component and ramp may be movable away from the transport module, thereby releasing the transport module. In this way, the transport module may be coupled to the handling apparatus in a defined manner or it may be decoupled from the handling apparatus for transferring to the scanning probe microscope.

According to an embodiment of the invention, the receiving area may be arranged between the ramp and the guide component when engaging with the transport module. In a corresponding manner, the target area may be arranged between the transport module and the guide component when engaging with the transport module. The transport device may thus be configured to move the measuring probe from one position between ramp and guide component to another position between guide component and transport module during a transfer of the measuring probe from the receiving area to the target area.

According to an embodiment of the invention, the handling apparatus may comprise a fixing device for selectively fixing the measuring probe to the target area. In a preferred embodiment, the handling apparatus may be equipped with a fixing mechanism, which fixes the measuring probe to the target area before or during extraction of the transport module. In other words, the handling apparatus may enable inserting a measuring probe with cantilever and probe tip (also referred to as cantilever chip with a cantilever) into a fixing mechanism as well as fixing it there. In this way it can be made possible that during a transport of the measuring probe at the transport module from the handling apparatus to the scanning probe microscope, the measuring probe is reliably secured to the transport module.

According to an embodiment of the invention, the fixing device may comprise a first fixing component in the region of the target area and a second fixing component, which is formed to be selectively movable towards the target area or movable away from the target area for switching between a state in which the measuring probe is detached from the target area and a state in which the measuring probe is fixed to the target area. The first fixing component and the second fixing component may thus cooperate in such a way, that in a spatially approximated relative state between both fixing components in comparison to a spatially more distant to each other relative state of both fixing components as a consequence of for example a distance dependent interaction force between the fixing components, the measuring probe may selectively be fixed or released.

According to an embodiment of the invention, the fixing device may be configured so that by moving closer the second fixing component, the state where the measuring probe is detached from the target area is turned on. In a corresponding manner, the fixing device may be configured so that by moving away the second fixing component, the state where the measuring probe is fixed to the target area is turned on. Moving away the second fixing component may be carried out advantageously for releasing the transport module, because after release of the transport module the measuring probe which is arranged thereto for transport to the scanning probe microscope should be preferably held firmly at the transport module. Descriptively speaking, a fixing force acting on the measuring probe may be turned on by moving away the second fixing component from the first fixing component. When the second fixing component is moved towards the first fixing component, the release of the measuring probe at the target area may advantageously be accomplished. The transport module may then be fixed to the handling apparatus for moving the now released measuring probe from the target area to the receiving area, or vice versa.

According to an embodiment of the invention, the fixing device may comprise a master force device (which may be attached to the second fixing component or which may form the second fixing component) for selectively exerting a master force on a fixing mechanism (which may be attached to the first fixing component or which may form the first fixing component), and may comprise this fixing mechanism, that is operable by the master force device for detaching and/or fixing the measuring probe that has been transported to the target area. Within the scope of the present application, the term "master force device" is to be understood in particular as a force creation device, which is formed to provide upon demand (for example machine controlled or user controlled) a temporarily acting master force. This may enable a contactless and therefore well reproducible fixing of the measuring probe to or detaching the measuring probe from the target area (at which also an insertion device may be provided, for example an insertion pocket, for inserting the measuring probe). Such a master force may optionally be turned on or off. According to the described embodiment, a robust fixing device for a measuring probe of a scanning probe microscope is provided, which is simultaneously insertable into the scanning probe microscope for many different measuring probe types or measuring methods, and which makes the measuring probe exchangeable without destruction. An embodiment of the invention enables the user to exchange the measuring probe safely, easily and intuitively. This increases the comfort of use in connection with mounting and exchanging the measuring probe. By means of the cooperation of an insertion device that can be handled intuitively, of a reversibly acting fixing mechanism and of a master force device for force based control of the fixing mechanism, preferably acting in a contactless manner, the handling of the measuring probe may be eased, an undesired mechanical destruction of the measuring probe may be prevented, and a misplacement of the measuring probe may be excluded. For this purpose, embodiments of the invention take advantage of the active principle, that with a master force device, the fixing mechanism for turning on/off the fixing force is subjected to a superior master force, under whose influence the measuring probe may selectively be fixed to or detached from by means of the fixing mechanism. The master force, which has been created by means of the master force device, may thereby be superposed on a fixing force of the fixing mechanism (in particular superposed in a way that weakens or even eliminates it) in such that then no resulting fixing force is exerted on the measuring probe and the measuring probe is thus detached.

According to an embodiment of the invention, the master force may be selected from a group, which consists of a master force device for exerting a magnetic master force (in particular applicable by means of a movable master force permanent magnet or by means of an electrically activatable master force electromagnet), a hydraulic master force, a pneumatic master force, an electric master force, a thermal master force, and a mechanical master force. All these force creation mechanisms may be implemented in a technically controlled manner, so that the exertion of an excessive or too little a force may advantageously be prevented.

According to an embodiment of the invention, the fixing mechanism or the first fixing component may comprise at least two magnetic elements, whose magnetic interaction force is formed to fix the measuring probe which was transported to the target area, in particular in a clamping manner. When one of both magnetic elements is immobilized (for example in a recess of a housing or of a fixing body) and the other one of both magnetic elements is free to move (for example in the recess of the housing or fixing body), a force may be created by the magnetic interaction of both magnetic elements, which force acts in a fixing manner on the measuring probe (which is in particular inserted in direction of the insertion direction), which is located at the target area. To be able to take the measuring probe off the target area (in particular taking it off from the insertion direction), a further magnetic field generating device (for example a movable permanent magnet or an electromagnet) can be used as an associated master force device, which superposes a superior magnetic force on the magnetic forces that are already acting, with which superior magnetic force one of the magnetic elements which acts directly or indirectly on the measuring probe may be pulled back, thereby releasing the measuring probe.

According to an embodiment of the invention, the fixing device may comprise a holding force amplification element (in particular a sphere) with a curved, in particular spherically curved, adhesive force transfer area, which, in a state where the measuring probe has been transported by the adhesive force transfer area to the target area, in particular in a punctiform manner, acts directly on the measuring device. This has the advantage, that the force effect can be applied by the adhesive force amplification element to the measuring probe essentially in a punctiform manner, so that the fixing force exerted by the fixing mechanism may act on the measuring probe accurate in position and with spatially concentrated and focused effect.

According to an embodiment of the invention, the transport device and the fixing device may be configured for acting together in such a way, that the measuring probe is first (by means of the transport device) transported to the target area and is not fixed to the target area (in particular pressed towards it, pulled towards it or sucked towards it) before fixing (by means of the fixing device). The transport device may first move the measuring probe longitudinally and thereby bring it closer to the target area, so that the measuring probe comes to lie in the region of the target area. An actual pressing (or such) of the measuring probe into physical contact with the target area may then occur by a movement in a direction that is different from the direction of the longitudinal shift (in particular essentially orthogonal to it) by means of the fixing device, which presses the measuring probe against the target area at a contact body (in particular a contact sheet or such) or fixes it there otherwise. Thus, according to the embodiment described, there can be a two-stage movement of the measuring probe on its way from one touch contact with the receiving area to a touch contact with the target area. This mechanism may advantageously be carried out in particular precisely.

Alternatively, the movement from the receiving area to the target area may be accomplished merely by the transport device alone.

According to an embodiment of the invention, the handling apparatus may comprise an insertion pocket or insertion device, which are limited in sections by the target area, in which insertion pocket or insertion device the measuring probe is at least partially inserted, when the measuring probe bears on the target area. The insertion pocket or the insertion device may on one side be limited from the target area at a contact body (for example a contact platelet, in particular a contact sheet). For example, opposite the target area, a fixing force may act on the measuring probe and press the measuring probe against the contact body or against the target area. On the part of the contact body, a master force may act on demand, which may for example counteract the fixing force for releasing the measuring probe.

According to an embodiment of the invention, the receiving area and/or the guide area (for example the ground area of the channel) of the guide structure and/or the target area may be formed as tilted areas in relation to a horizontal plane. This tilt may be in particular such, that during transport from the receiving area to or into a region of the target area, the measuring probe moves at least in sections downwards along the tilted area. During the movement from the receiving area to the target area, the measuring probe may, descriptively speaking, at least in sections slide down a tilted plane, so that the installation of the measuring probe in the transport module is carried out under an angle, which corresponds to the final target position of the measuring probe in the transport module and in further consequence in the scanning probe microscope.

In particular, a handling apparatus according to an exemplary embodiment may comprise a movable ramp, preferably with an inclined surface. On this preferably tilted or inclined surface, the measuring probe or the cantilever chip comes to lie, preferably with the probe tip pointing up. The associated probe body may be introduced by means of a sled along the incline (descriptively speaking downhill) into the transport module (which may also be named cantilever holder or cantilever module). Conversely, a measuring probe which has already been used in a scanning probe microscope beforehand may be pulled out of the transport module with this sled and a spring tongue which is fixed thereto. During these movements, the measuring probe may be guided in a controlled and defined manner. Corresponding recesses, which may, according to exemplary embodiments of the invention, be provided at the guide structure or at the transport device, may ensure that the cantilever and the probe tip of the measuring probe are not damaged.

According to an embodiment of the invention, the handling apparatus may comprise a locking mechanism for disabling a movement of a component (or of more components relative to each another, for example ramp relative to sled) of the handling apparatus, which movements would expose the cantilever and/or the probe tip and/or the insertion pocket to mechanical stress. If, for example, a sled has guided the measuring probe to the target area, a movement of the ramp in an opposite direction may lead to un undesired movement of a hook of a discharge pusher over the measuring probe and damage the latter. This can be prevented by means of an according locking mechanism.

According to an embodiment of the invention, the scanning probe microscope may comprise a transport module interface for coupling a transport module with the features described above in such a way, that after coupling the transport module (with a measuring probe that is arranged at its target area, in particular fixed thereto) to the transport module interface, the measuring probe at the transport module is operational for sensing in a scanning manner the surface of the sample body. If the measuring probe has thus been arranged or preferably fixed onto the transport module by a corresponding handling of the handling apparatus, a user may attach the transport module, together with the measuring probe, at the scanning probe microscope. By doing so, the measuring probe may preferably be brought immediately into a measuring position.

According to an embodiment of the invention, after transporting the measuring probe to the target area, the method may comprise separating a transport module comprising the target area, together with the measuring probe, from the rest of the handling apparatus, and coupling the transport module, together with the measuring probe which is located at the target area, to the scanning probe microscope. For this purpose, a user may move the measuring probe, which is arranged at the transport module and preferably fixed thereto, to the scanning probe microscope and couple it there. Preferably, after the coupling, the method may comprise operating the scanning probe microscope for determining surface information regarding a sample body by sensing in a scanning manner the surface of a sample body by means of the measuring probe. Further, in an embodiment of the invention, after determining the surface information, the method of the sample body may comprise separating the transport module, together with the measuring probe, from the scanning probe microscope, and a re-coupling of the transport module, together with the measuring probe, to the handling apparatus. Thereafter, in this method, the measuring probe at the transport module in the handling apparatus may be driven from the target area along the guide structure back to the receiving area. There, a user may take the measuring probe off the receiving area (for example with tweezers). In this manner, the handling apparatus may support both mounting the measuring probe at the scanning probe microscope and dismounting the measuring probe from the scanning probe microscope.

According to an embodiment of the invention, the scanning probe microscope may be formed as scanning force microscope. The scanning force microscope, also named force microscope or atomic force microscope (AFM), is a special kind of scanning probe microscope. It serves as tool in surface chemistry and is used for mechanical sensing of surfaces and measurement of atomic forces on the nanometer scale.

In the following, exemplary embodiments of the present invention are described in detail with reference to the following figures.

DETAILED DESCRIPTION OF EXEMPLARY EMBODIMENTS

It is noted that in different figures, similar or identical components are provided with the same reference signs.

Before exemplary embodiments of the invention are being described with reference to the figures, a few general aspects of the invention and of the underlying technologies shall be explained:

For a measurement with a scanning probe microscope, a measuring probe (for example a cantilever chip in the size of 1.6 mm×2.4 mm [0.063 inch×0.134 inch]) is conventionally to be inserted by means of tweezers into a designated measuring probe reception (also named a cantilever holder). Therefore, from an operator's point of view, the exchange of a measuring probe poses a fine motor challenge, which can lead to damage of the measuring probe and/or of the measuring probe reception when handled improperly.

Conventionally, there is only a laborious and moderately intuitive procedure for exchanging a measuring probe, which is due to the fine motor manipulation by means of tweezers linked to a high rate of failure for the unskilled operator. There is the risk that the measuring probe and/or parts of a scanner-unit of a scanning probe microscope may be damaged.

According to an exemplary embodiment of the invention, a handling apparatus for a controlled exchange of measuring probes is provided. In particular, a simplified, safe, reproducible, and at the same time fast exchange of a measuring probe with the help of a tool as handling apparatus for a controlled loading and unloading of measuring probes is made possible.

Figure 1:
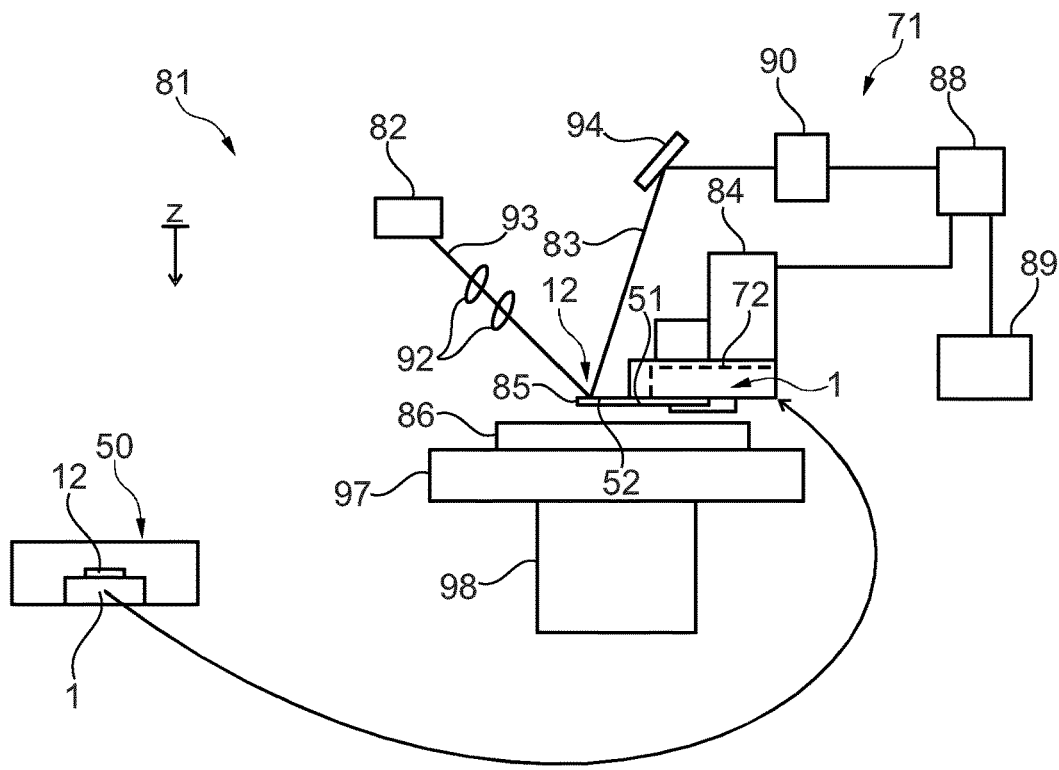
FIG. 1 shows an arrangement with a handling apparatus for handling a measuring probe and an associated scanning probe microscope according to an exemplary embodiment of the invention.

FIG. 1 shows an arrangement 71 with a handling apparatus 50 for handling a measuring probe 12 and an associated scanning probe microscope 81 according to an exemplary embodiment of the invention. In particular, FIG. 1 illustrates a scanning probe microscope 81 according to an exemplary embodiment of the invention, which is formed as scanning force microscope (atomic force microscope, AFM).

Figure 2:
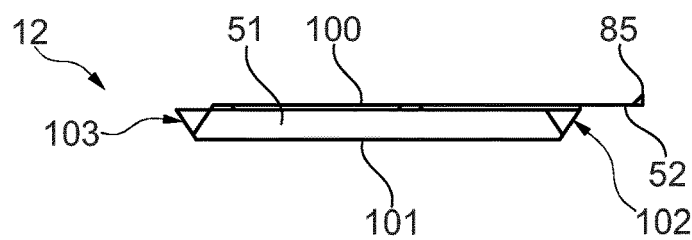
FIG. 2 shows a side view of a measuring probe with a probe body, a probe tip and a cantilever which is arranged in between according to an exemplary embodiment of the invention.
Figure 3:
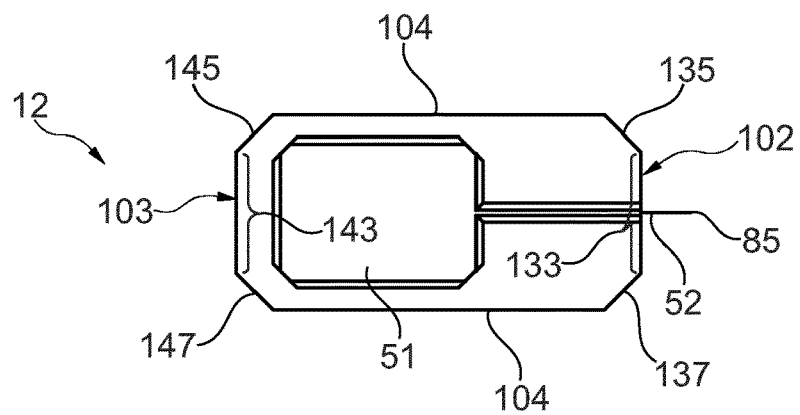
FIG. 3 shows a top view of the measuring probe according to FIG. 2.

In the scanning probe microscope 81, a cantilever deflection, i.e. a change in position or a change in the form of a measuring probe 12, shown in more detail in FIG. 2 and FIG. 3, is detected with the help of an optical sensor system. The measuring probe 12 comprises a probe body 51 and a probe tip 85 which is connected to the probe body 51 by means of a cantilever 52. An electromagnetic radiation source 82 (for example a laser source) emits an electromagnetic primary ray 93 (in particular a light ray) via a focusing device 92 (which may be formed as an arrangement of one or more optical lenses) onto the measuring probe 12. The electromagnetic secondary ray 83, which is reflected off the measuring probe 12, propagates to a photo and position sensitive detector 90 (in particular, the electromagnetic secondary ray 83 may be deflected to the position sensitive detector 90 by means of a passive reflector 94 or another optical deflection element). If the measuring probe 12 is brought into motion by an actuator 84 (which can effect a change in position in the vertical z-direction according to FIG. 1) and/or if the measuring probe 12 changes its shape, a change of the laser light may be detected at the position sensitive detector 90. Depending on the interaction of measuring tip 85 (also named cantilever tip) of the measuring probe 12 with a sample body 86 which is to be examined or characterized, the deflection of the measuring probe 12 may vary and an associated region at the detector 90 is hit by the electromagnetic secondary ray 83. The detector signal may then be processed in an evaluation unit 88. The resulting high-resolution image of the surface of the sample body 86 may then be depicted by means of a display device 89. A surface of the sample body 86 may be sensed in a scanning manner with the measuring tip 85 (i.e. a sensitive tip of the measuring probe 12). A sample table 97 is movable in the horizontal plane according to FIG. 1 (i.e. in an x- and a y-direction that is orthogonal to the z-axis) by actuators 98. Thus, the scanning probe microscope 81 serves for determining surface information with regard to the sample body 86 by means of sensing in a scanning manner a surface of the sample body 86 by means of a measuring probe 12.

The arrangement 71 depicted in FIG. 1 comprises, apart from the scanning probe microscope 81, the handling apparatus 50 for handling the measuring probe 12. The handling apparatus 50 serves as tool which is in this case provided separately from the scanning probe microscope 81 in order to make the handling and mounting of the measuring probe 12 at the scanning probe microscope 81 possible for the user. For that purpose, as is described with reference to FIG. 4 to FIG. 20, the measuring probe 12 is first fixed by means of the handling apparatus 50 to a transport module 1. The transport module 1, together with measuring probe 12, is then taken off the handling apparatus 50 and coupled to the scanning probe microscope 81. The latter is depicted schematically in FIG. 1: the scanning probe microscope 81 comprises a transport module interface 72 for coupling the transport module 1, so that after coupling the transport module 1 to the transport module interface 72 of the scanning probe microscope 81, the measuring probe 12 and the transport module 1 are operational for sensing in a scanning manner the surface of a sample body 86.

FIG. 2 shows a side view of the measuring probe 12 with its platelet-shaped probe body 51, its point shaped probe tip 85 and its cantilever 52 which is arranged in between and formed as flexible arm.

FIG. 3 shows a top view of the measuring probe 12 according to FIG. 2. In FIG. 2 and FIG. 3 a top side 100, a bottom side 101, a front side 102, a rear side 103 and side areas 104 of the measuring probe 12 are depicted. The front side 102 comprises the vertical area 133 depicted on the right side of the measuring probe 12 as well as both adjacent chamfers 135, 137. The rear side 103 comprises the vertical area 134 depicted on the left side of the measuring probe 12 as well as both adjacent chamfers 145, 147. The probe body 51 is a plane platelet with a length and a width typically in the region of a few millimeters. The cantilever 52 has a width of for example a few microns. The probe tip 85 has dimensions which are in the region of those of the cantilever 52 or below.

Figure 4:
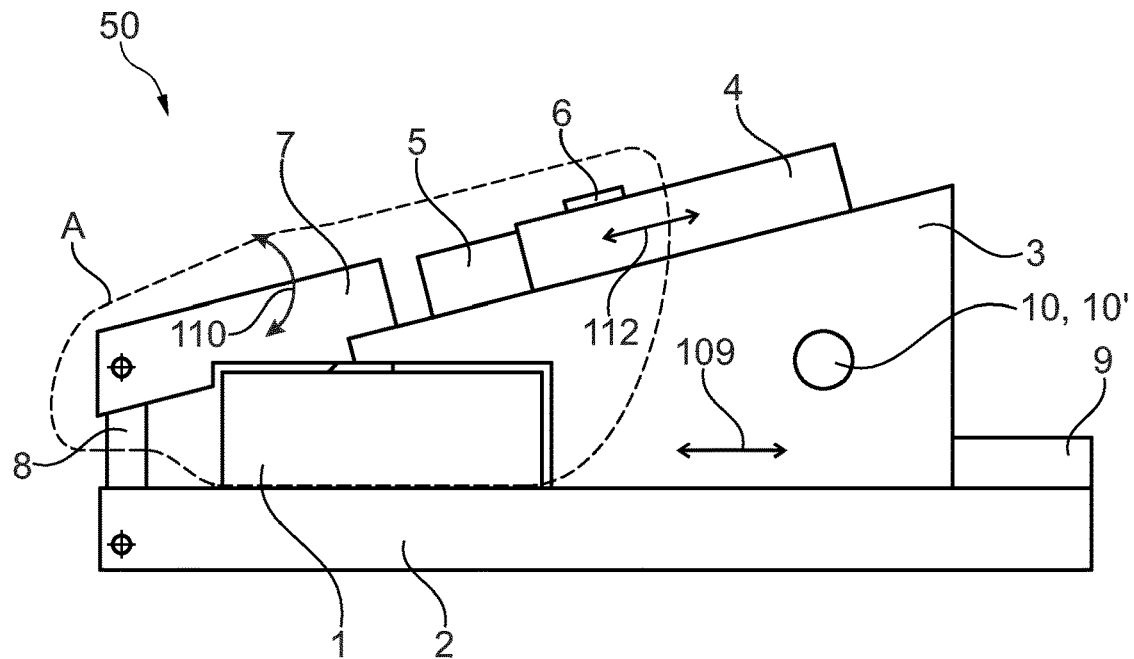
FIG. 4 shows a schematic side view of a handling apparatus according to an exemplary embodiment of the invention.
Figure 4A:
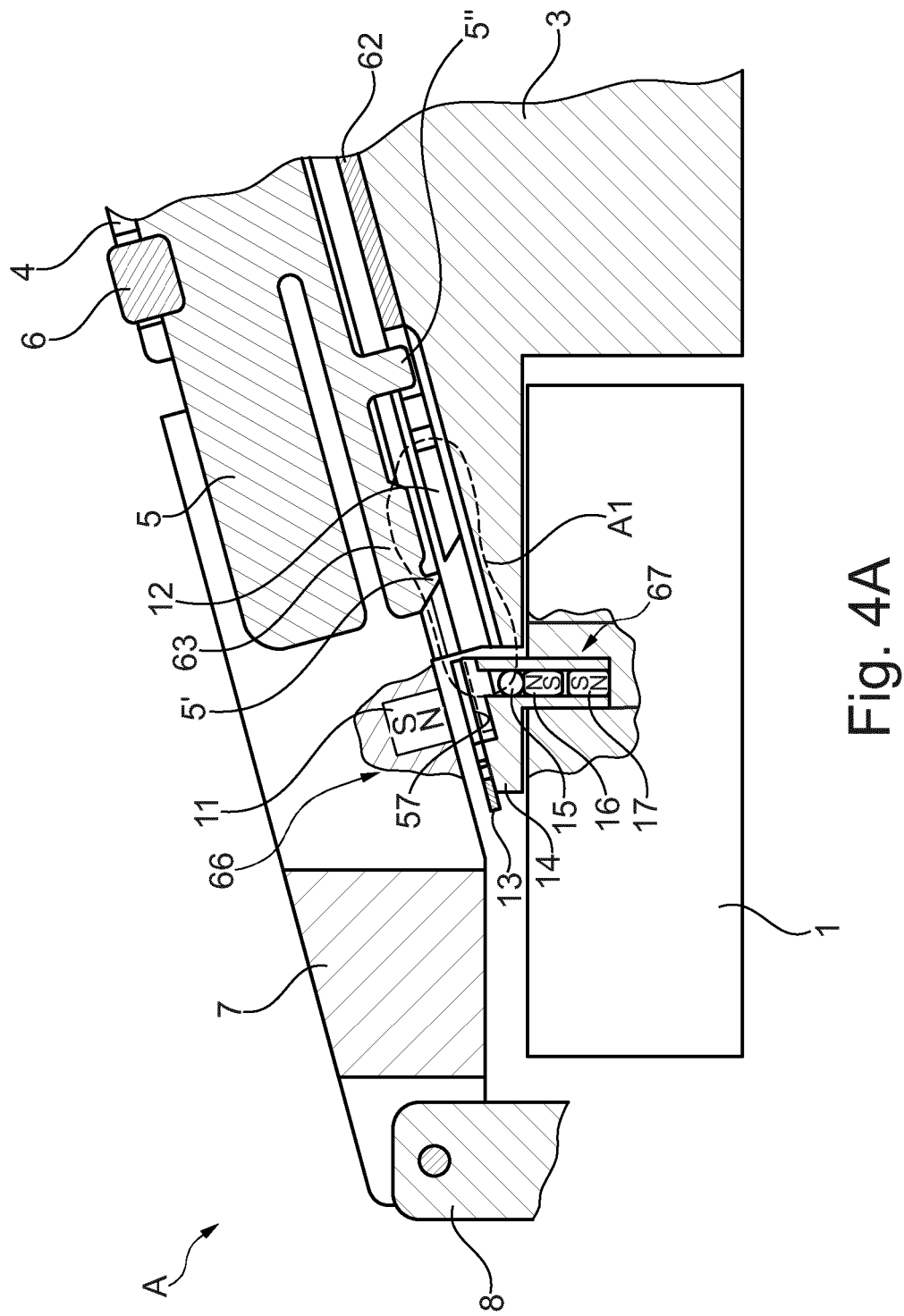
FIG. 4A shows a detail A according to FIG. 4.
Figure 4B:
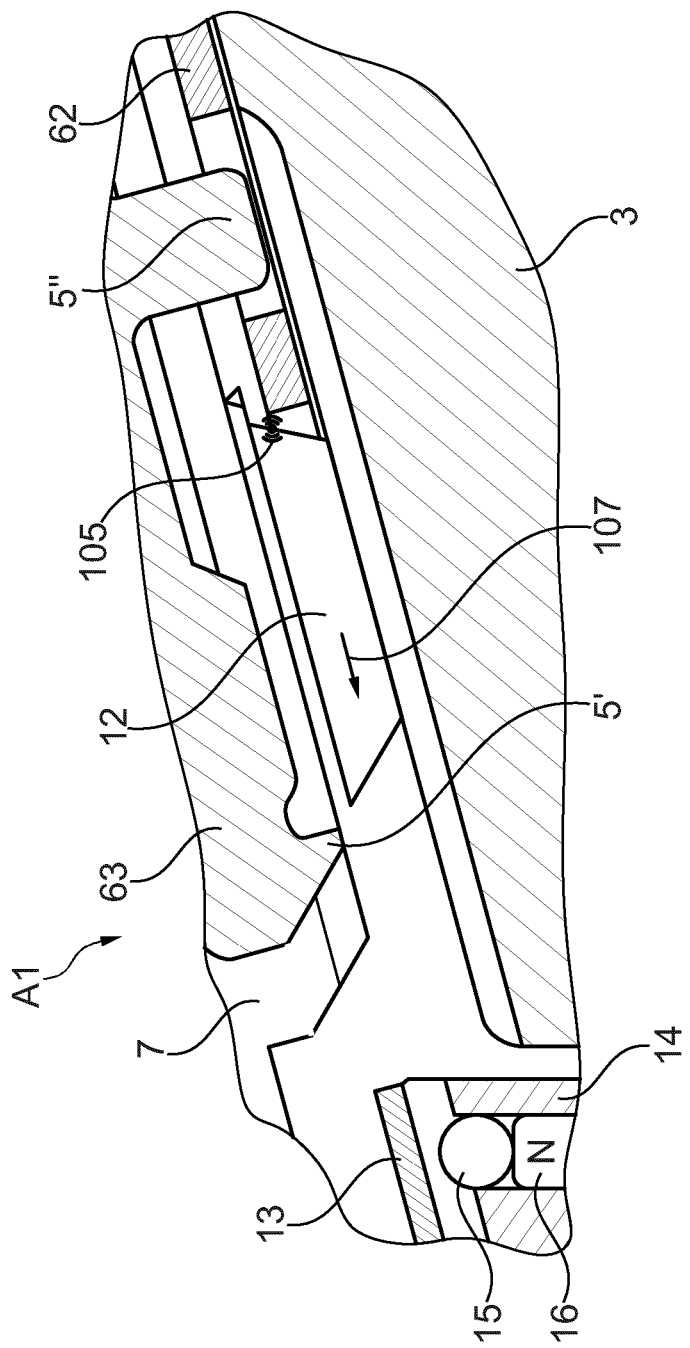
FIG. 4B shows a detail Al according to FIG. 4A.
Figure 4C:
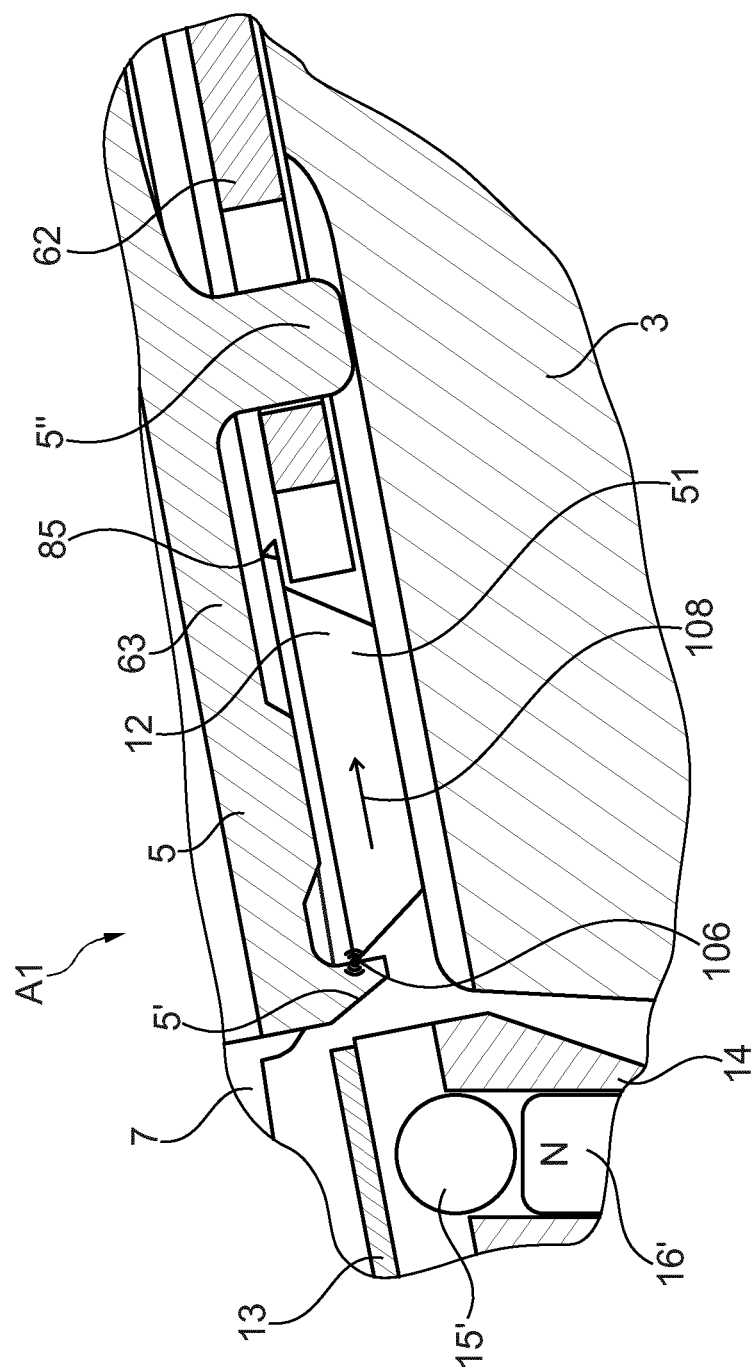
FIG. 4C shows a detail Al according to FIG. 4A in an operational state of the handling apparatus that is different from the operational state of the handling apparatus in FIG. 4B.

FIG. 4 shows a schematic side view of a handling apparatus 50 according to an exemplary embodiment of the invention. FIG. 4A shows a detail A according to FIG. 4. FIG. 4B shows a detail A1 according to FIG. 4A. FIG. 4C shows the detail A1 according to FIG. 4A in an operational state of the handling apparatus 50 that is different from the operational state of the handling apparatus 50 in FIG. 4B. FIG. 4C illustrates the situation during an extraction of the measuring probe 12, which has been arranged at the transport module 1 before, out of the transport module 1, where a force effect occurs to the measuring probe 12 at a position 106. In contrast, FIG. 4B shows the situation during inserting the measuring probe 12 into the transport module 1, at which a force effect occurs to the measuring probe 12 at a position 105.

Figure 5:
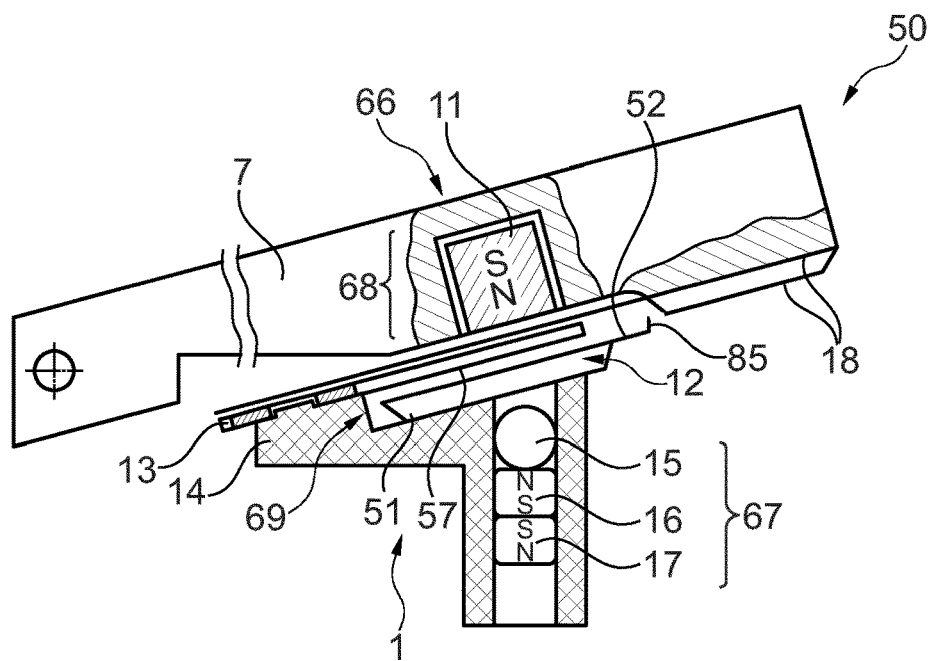
FIG. 5 shows a portion of a handling apparatus according to an exemplary embodiment of the invention.
Figure 6:
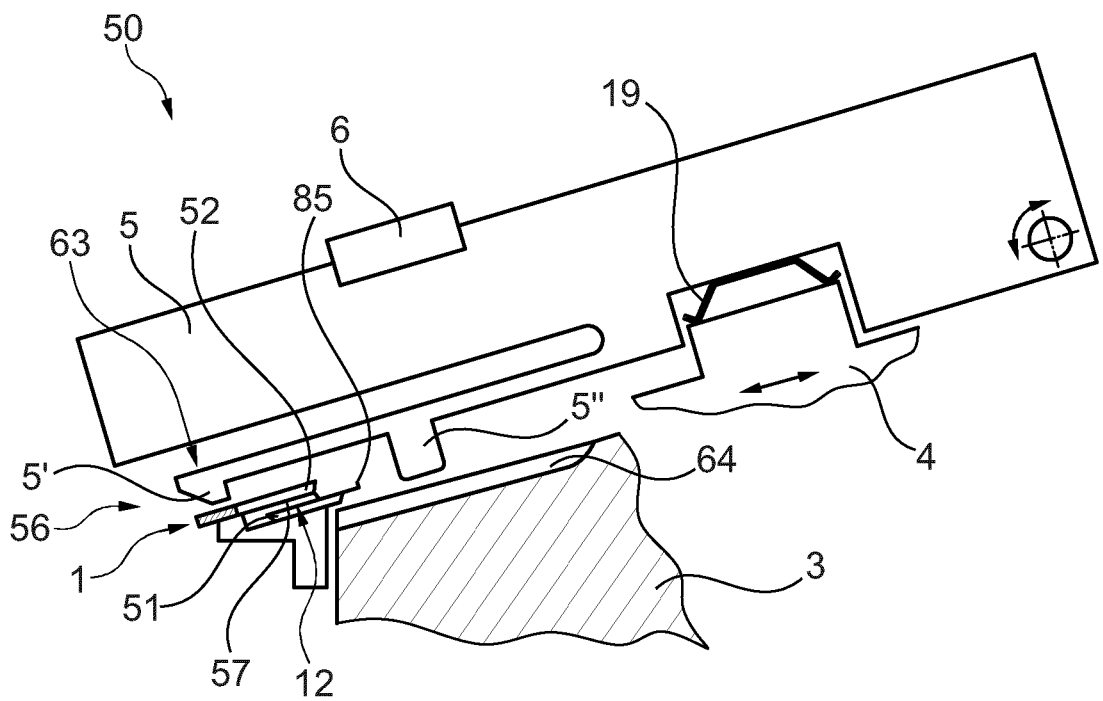
FIG. 6 shows another portion of a handling apparatus according to an exemplary embodiment of the invention.
Figure 7:
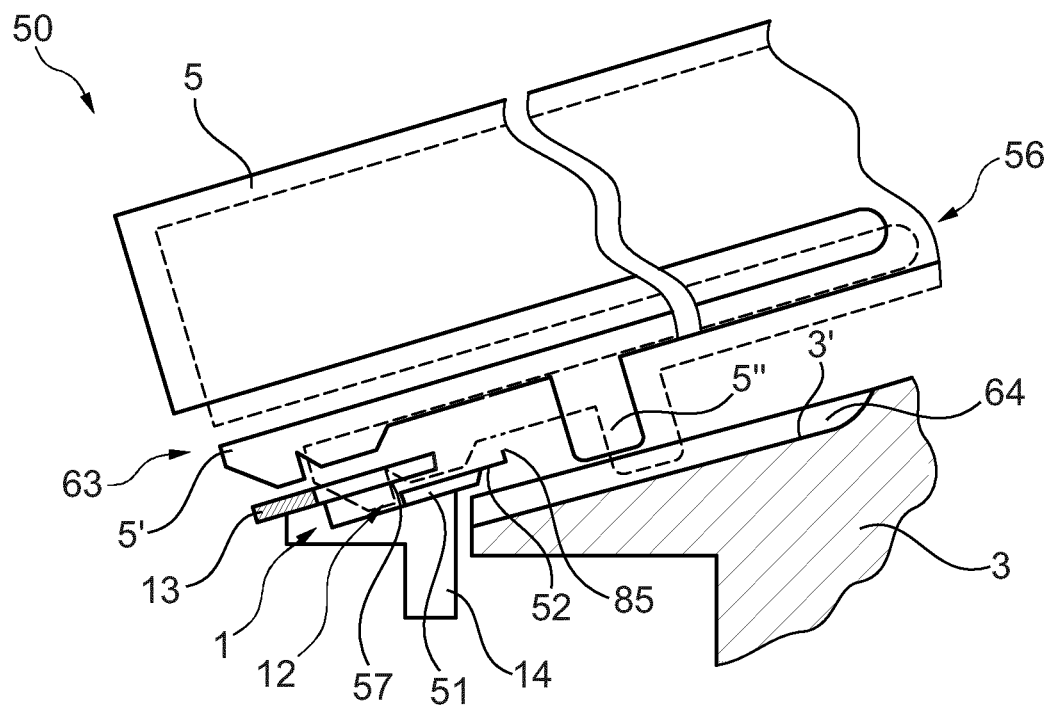
FIG. 7 shows a detail of FIG. 6.
Figure 8:
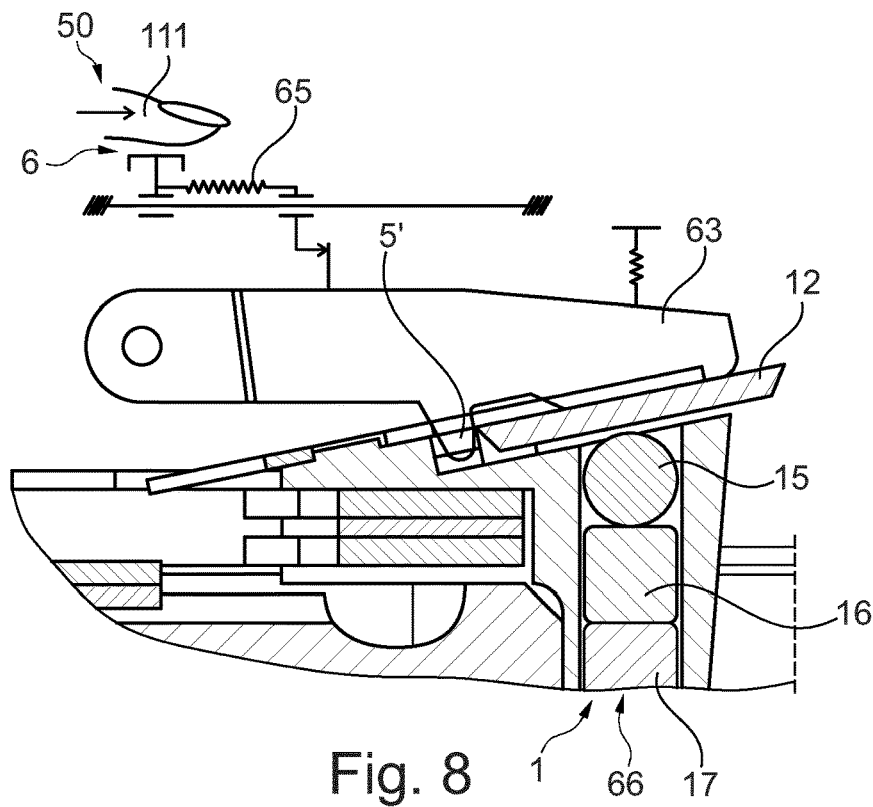
FIG. 8 shows a portion of a handling apparatus according to another exemplary embodiment of the invention.
Figure 9:
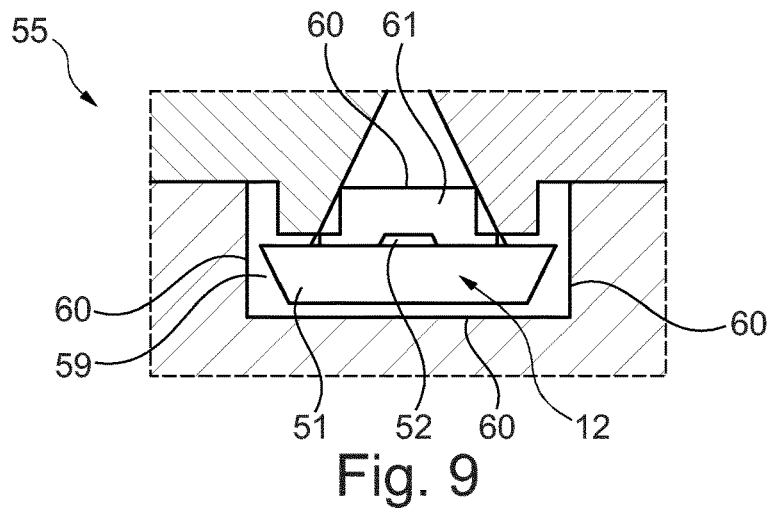
FIG. 9 shows a cross section of a guide structure of a handling apparatus according to an exemplary embodiment of the invention.
Figure 10:
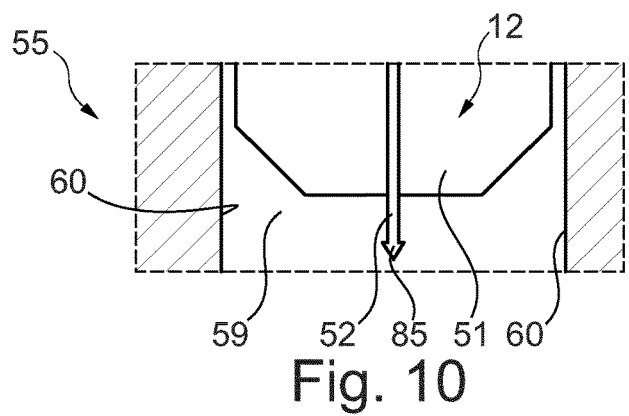
FIG. 10 shows a top view of the guide structure according to FIG. 9.
Figure 11:
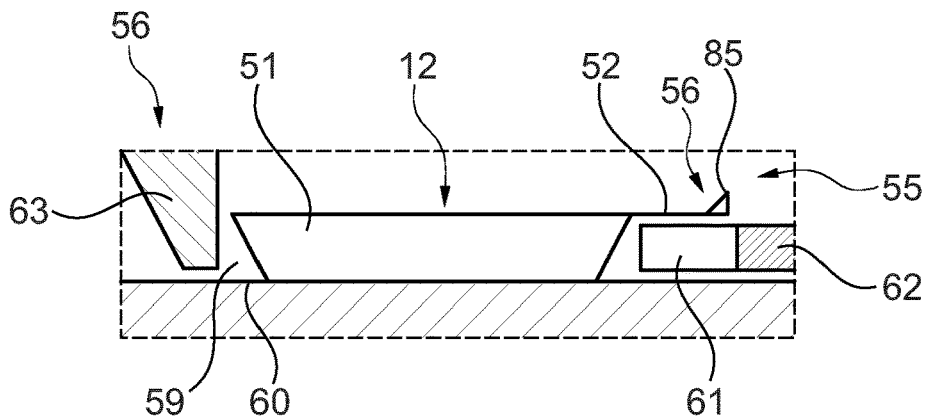
FIG. 11 shows a side view of a guide structure with measuring probe of a handling apparatus guided therein according to an exemplary embodiment of the invention.
Figure 12:
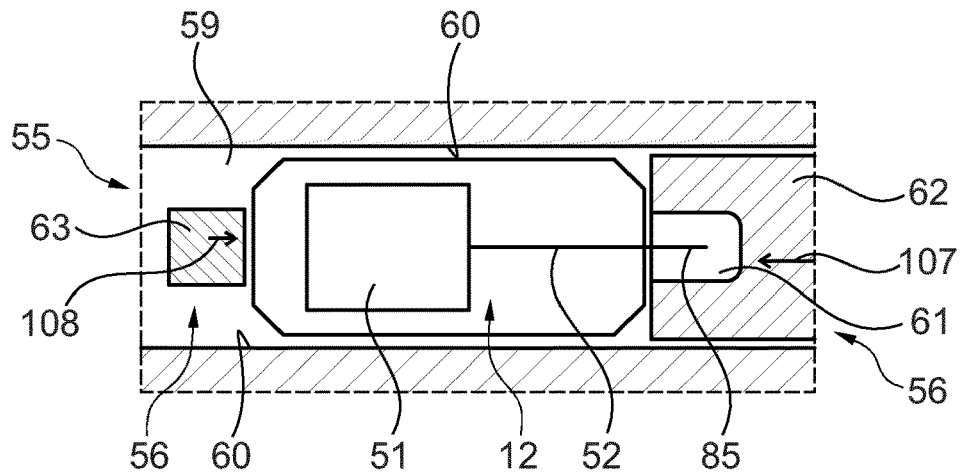
FIG. 12 shows a top view of the guide structure together with measuring probe according to FIG. 11.
Figure 13:
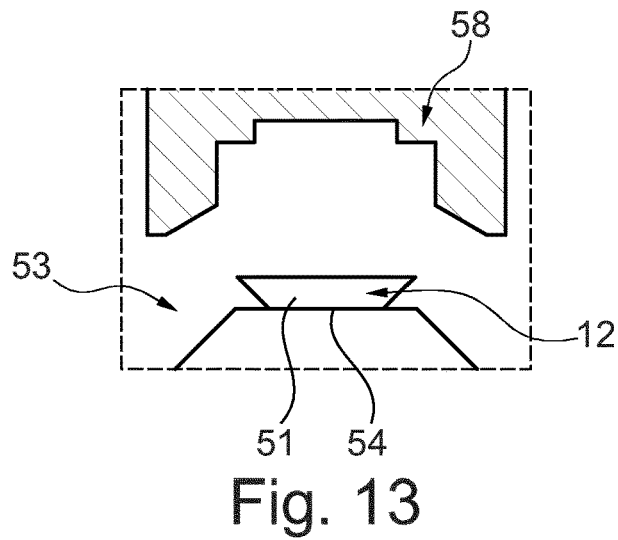
FIG. 13 shows a receiving area together with measuring probe and a cover device of a handling apparatus according to an exemplary embodiment of the invention.
Figure 14:
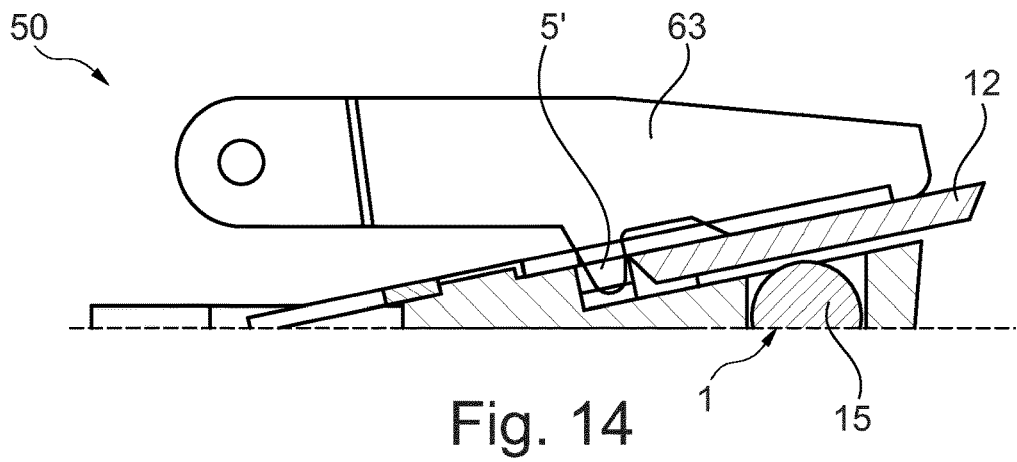
FIG. 14 shows a portion of the handling apparatus according to FIG. 9.
Figure 15:
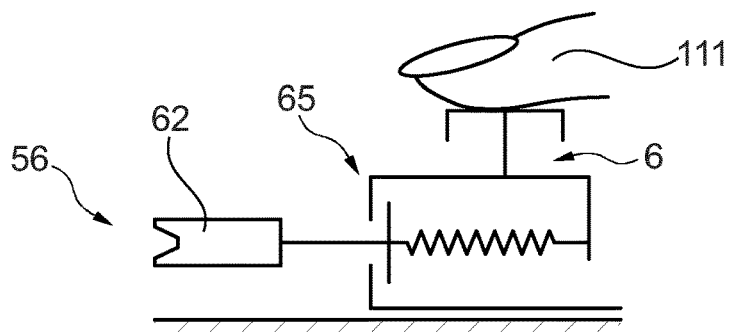
FIG. 15 shows a force limitation mechanism of an actuating device of a handling apparatus according to an exemplary embodiment of the invention.
Figure 16:
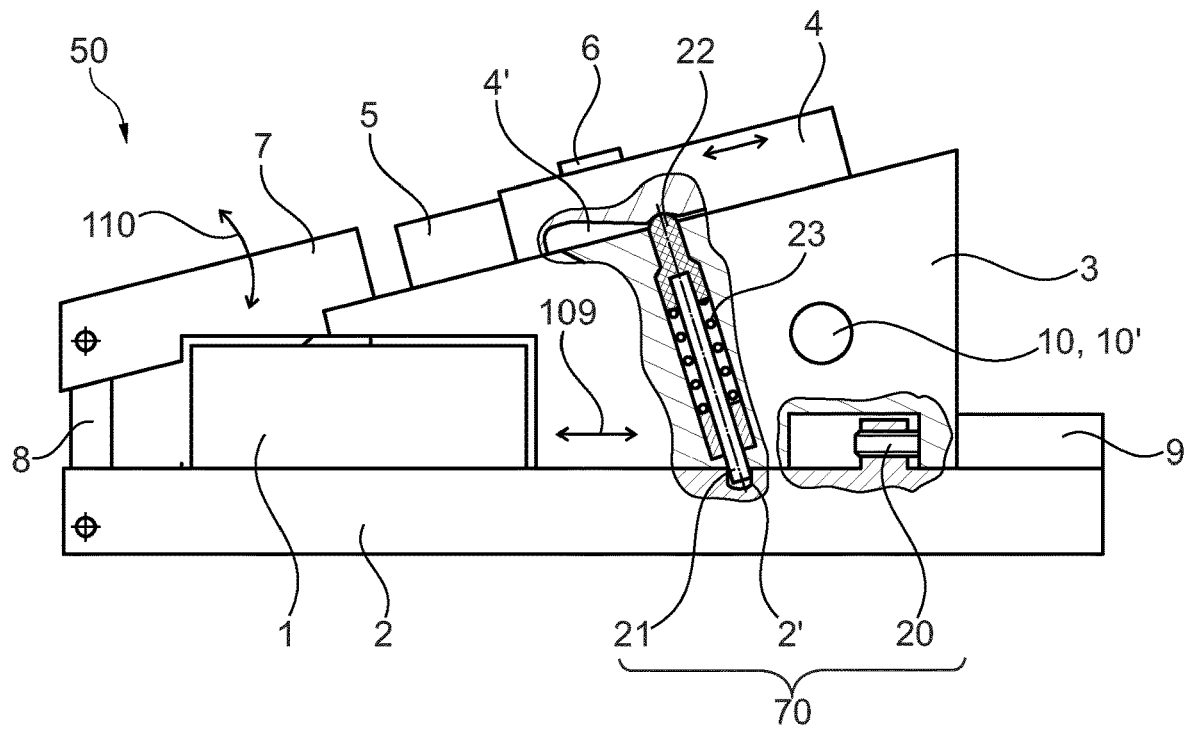
FIG. 16 shows a handling apparatus according to an exemplary embodiment of the invention with a protection mechanism against destruction of a measuring probe.

FIG. 5 shows a portion of the Detail A which is depicted in FIG. 4A. FIG. 6 shows a portion of the handling apparatus 50. FIG. 7 shows a detail of FIG. 6 in two different operational states of a discharge pusher 63 (dotted and with solid lines). FIG. 8 shows a portion of a handling apparatus 50 according to another exemplary embodiment of the invention and demonstrates during manual operation a force transmission from a user onto the handling apparatus 50. FIG. 9 shows a cross section of a guide structure 55 of a handling apparatus 50 according to an exemplary embodiment of the invention. FIG. 10 shows a top view of the guide structure 55 according to FIG. 9. FIG. 11 shows a side view of the guide structure 55 having guided therein a measuring probe 12 of a handling apparatus 50, according to an exemplary embodiment of the invention. FIG. 12 shows a top view of the guide structure 55 together with measuring probe 12 according to FIG. 11. FIG. 13 shows a receiving area 54 together with measuring probe 12 and a cover device 58 of a handling apparatus 50 according to an exemplary embodiment of the invention. FIG. 14 shows a portion of a handling apparatus 50 according to FIG. 8. FIG. 15 shows a force limitation mechanism 65 of an actuating device 6 of a handling apparatus 50 according to an exemplary embodiment of the invention. FIG. 16 shows a portion of a handling apparatus 50 according to an exemplary embodiment of the invention with a locking mechanism 70, which protects the measuring probe 12 from mechanical damage or destruction.

The handling apparatus 50, depicted in an overview in FIG. 4, serves for handling the measuring probe 12 shown in FIG. 2 and FIG. 3 of the scanning probe microscope 81 illustrated in FIG. 1.

As can best be seen in FIG. 13, the handling apparatus 50 comprises a receiving device 53 for receiving the measuring probe 12 at a receiving area 54. A user places (for example by means of tweezers which are not depicted) the measuring probe 12 onto the receiving area 54 and covers it thereafter with a lid-like cover device 58 for placing onto the receiving device 53.

By means of a guide structure 55, which is depicted in FIG. 9 to FIG. 12, the measuring probe 12 may be guided from the receiving area 54 to a target area 57 shown in FIG. 6 and FIG. 7 of a transport module 1. During the guided movement of the measuring probe 12 along the guide structure 55, the probe body 51 may be delimited entirely by walls 60 and pushers 62, 63 and the cantilever 52 and the probe tip 85 may be mounted in a contactless manner. Thereby, a precise and safe guidance is combined with a damage-free handling of the measuring probe 12. For this purpose, the guide structure 55 comprises a stretched channel 59, which may be formed at least partially as part of a ramp 3 and which extends between the receiving area 54 and the target area 57. During its transport between the receiving area 54 and the target area 57, the measuring probe 12 is guided along the channel 59 in a defined manner. FIG. 9 to FIG. 12 show how a channel 59 is delimited by means of top, bottom, and lateral walls 60. The measuring probe 12 is arranged within the channel 59 with a certain clearance or distance to the walls 60 and is yet precisely guidable along the extension of the channel 59. FIG. 9 shows that the top side wall 60 has an exemption 61 for releasing the cantilever 52 and the probe tip 85 in a contactless manner, in order to protect them during the guidance along the channel 59 from mechanical damage. With the channel geometry according to FIG. 9 to FIG. 12, the measuring probe 12 may be controlled completely without the necessity of maximum precision regarding the guidance.

A transport device 56, which can best be seen in FIG. 11 or FIG. 12, serves for transporting the measuring probe 12 from the receiving area 54 along the guide structure 55 to the target area 57 or back from the target area 57 to the receiving area 54.

To manage the forward transport from the receiving area 54 to the target area 57, a transport device 56 comprises a feeding pusher 62 for pushing the measuring probe 12 from the receiving area 54 to the target area 57 (see FIG. 4A to FIG. 4C as well as FIG. 11 and FIG. 12). An according pushing direction of the feeding pusher 62 is shown in FIG. 4B and FIG. 12 with reference sign 107. Advantageously, the feeding pusher 62 comprises an exemption 61 which can be seen in FIG. 12 for releasing the cantilever 52 and the probe tip 85 in a contactless manner. While the feeding pusher 62 pushes the measuring probe 12 in pushing direction 107 to the target area 57, it engages at the front side of the measuring probe 12. Meanwhile, neither the cantilever 52 nor the probe tip 85 are touched by the feeding pusher 62, since during pushing, both remain in the exemption 61 with distance to the feeding pusher 62. This distance is kept up during the complete shift of the measuring probe 12 by means of the feeding pusher 62 from the receiving 54 to the target area 57.

To manage the pushing or pulling of the measuring probe 12 from the target area 57 back to the receiving area 54, the transport device 56 comprises a discharge pusher 63 which is shown in FIG. 4A to FIG. 4C, FIG. 6, FIG. 7 as well as FIG. 11, and FIG. 12. The discharge pusher 63 may be formed as solid-state joint, which advantageously, during operation, exerts only little force on the measuring probe 12 and therefore reliably avoids a damage to the measuring probe 12. A corresponding pushing direction (which is alternative and opposite to pushing direction 107) of the discharge pusher 63 is depicted in FIG. 4C and FIG. 12 with reference sign 108. The discharge pusher 63 is merely formed for acting on the probe body 51 of the measuring probe 12 and engages therefor exclusively at the rear side 103 of the probe body 51. Descriptively speaking, the discharge pusher 63 pulls or drags the measuring probe 12 from the target area 57 back to the receiving area 54. Advantageously, the discharge pusher 63 may be formed as spring tongue. For that, the discharge pusher 63 comprises a hook 5' which acts on measuring probe 12 during shifting and a release nose 5" which is actively coupled with the hook 5' and which sinks into the recess 64 during shifting. This can best be seen in FIG. 7. When the measuring probe 12 reaches the receiving area 54 due to the shifting in pushing direction 108, the release nose 5" is guided out of the recess 64, whereby the hook 5' inevitably releases the measuring probe 12. In the direction of the extension, perpendicular to a pushing direction 107, 108, the discharge pusher 63 may be formed narrower than the feeding pusher 62, see FIG. 12.

An actuating device 6 of the handling apparatus 50 serves for actuating the discharge pusher 63. By moving a sled 4, the transport device 56 (more precisely its pushers 62, 63) is moved by a user. As can be seen in FIG. 8 and FIG. 15, the actuating device 6 may comprise a force limitation device 65 for limiting a force that is exerted by a user on the actuating device 6 in such a way, that a force being exerted on the transport device 56 does not exceed a pre-definable threshold value. By means of the actuating device 6, in particular the discharge pusher 63 may be actuated. Therefore, a user also acts on the sensitive measuring probe 12 by means of the actuating device 6. To mechanically disable an unintended and undesired excessive force transmission from the user to the measuring probe 12 mechanically, a corresponding force decoupling may for example be implemented by means of a spring member which is depicted schematically in FIG. 8 and FIG. 15, together with a coupling, when excessive actuating forces are exerted.

Moreover, the handling apparatus 50 comprises a fixing device 66, which can best be seen in FIG. 5, for selectively fixing the measuring probe 12 to the target area 57, as will be described in more detail the following. The fixing device 66 comprises a bottom side first fixing component 67 in the region of, or actively linked to the target area 57. The first fixing component 67 may be formed as part of the transport module 1. A top side second fixing component 68 may be formed as part of guide component 7, which (as described in more detail below) may be hinged away from the transport module 1 by using a hinge (see reference sign 8), or —as shown in FIG. 4A—hinged towards transport module 1. Thus, both fixing components 67, 68 are designed, together and dependent on the hinge-state of the guide component 7, for switching between a state where the measuring probe 12 is fixed to the target area 57 and a state where the measuring probe 12 is detached from the target area 57 (see FIG. 5), to be selectively in relation to each other movable towards the target area 57 or movable away from the target area 57. Thus, the fixing device 66 is configured for turning on the state where the measuring probe 12 is detached from the target area 57 by means of moving the second fixing component 68 towards the target area 57 or for turning on the state where the measuring probe 12 is fixed to the target area 57 by means of moving away the second fixing component 68. For this purpose, the second fixing component 68 of the fixing device 66 comprises a master force device 11 for selectively exerting a magnetic master force on a fixing mechanism of the first fixing component 67, which is formed by the components 15, 16, 17. Thus, the fixing mechanism 15, 16, 17 may be actuated by means of the master force device 11 for detaching and/or fixing the measuring probe 12, which has been transported to the target area 57. The fixing mechanism 15, 16, 17 comprises two magnetic elements 16, 17, whose mutually repulsive magnetic interaction force is designer to fix the measuring probe 12, which has been transported to the target area 57, in a clamping manner. Furthermore, the fixing device 66 comprises a spherical holding force amplification element 15 with a spherically curved adhesive force transfer area, which, in a state where the measuring probe 12 has been transported to the target area 57, may act in a clamping and punctiform manner and directly on the measuring probe 12 by means of the adhesive force transfer area. Furthermore, according to FIG. 4A and FIG. 5 there is provided an insertion pocket 69 which is limited on the top of the target area 57, in which insertion pocket 69 the measuring probe 12 is inserted when the measuring probe 12 rests on the target area 57.

The fixing mechanism 15, 16, 17 comprises two magnetic elements 16, 17, which, in this case, are formed as permanent magnets (alternatively as electromagnets), which are arranged in a reception cavity. A north pole of the respective magnetic elements 16, 17 is labeled "N" in the figures, whereas a south pole of the respective magnetic elements 16, 17 is labeled "S" in the figures. The two magnetic elements 16, 17 are, according to FIG. 5, arranged in the same of both oppositely located fixing components 67, 68, namely in fixing component 67. In the embodiment that is shown, the magnetic interaction force between the magnetic elements 16, 17 is formed in such a way that the measuring probe that is inserted into the insertion pocket 69 is fixed in a clamping manner in the insertion pocket by this magnetic interaction force in the absence of a master force (not shown). As can be derived from the references S or N in FIG. 5, the two magnetic elements 16, 17 repel each other. Due to this repelling magnetic interaction force, the magnetic elements 16, 17 are acting on the measuring probe 12, which has been inserted into the insertion pocket 68, in such a way that the measuring probe 12 is fixed in a clamping manner in the insertion pocket 69. The magnetic element is supported immovably in the fixing component 67, for example glued. The magnetic element on the contrary is supported movably in the fixing component 67. Under the influence of the repelling magnet force, the magnetic element 16 is thus pushed in the direction of the reception cavity of the insertion cavity 69 and thus exerts a fixing clamping force on the measuring probe 12. Advantageously, the insertion pocket 69 comprises in addition an optional and in the shown embodiment spherical or ball shaped holding force amplification element 15. The holding force amplification element 15 acts as link or force transmitter between the magnetic element 6 and the measuring probe 12, which has been inserted into the reception cavity, and thereby presses in a state, where there measuring probe 12 is inserted into the insertion pocket 69, directly onto the measuring probe 12 with a spherically curved contact area. The measuring probe 12 is thereby approximately subjected in a punctiform manner to a strong clamping force.

According to FIG. 5, a direct magnetic clamping results by using a repelling magnetic force between the magnetic elements 16, 17. In this embodiment, the measuring probe 12 or the cantilever chip are also clamped between a contact sheet 13 and the adhesive force amplification element 15. Neighboring to the movable magnetic element 16, the fixed magnetic element 17 is attached, wherein the magnetic elements 16, 17 are arranged relative to each other in such a way, that both magnetic elements 16, 17 repel each other.

The transport device 56 and the fixing device 66 may be configured for acting together in such a way, that the measuring probe 12 is first transported to the target area 57 and is pressed against the target area 57 during fixing. More precisely speaking, by means of the transport device 56, the measuring probe 12 may be driven from the receiving area 54 to the region of the target area 57, so that the measuring probe 12, as shown in FIG. 5, comes to lie in the target area 57, however in the embodiment shown still without a touching contact. A clamping touching of the measuring probe 12 at the target area 57 at the contact sheet 13 may be triggered by activating the fixing device 66 by driving the adhesive force amplification element 15 to the measuring probe 12.

The clamping of the measuring probe 12 between the adhesive force amplification element 15 and the contact sheet 13 is released by impressing onto the field of the fixed magnet 17 a thereto oppositely oriented magnetic field, which repels the movable magnetic element 16 from the measuring probe 12 and which reduces the clamping force to a negligible degree. In the shown embodiment, this is accomplished by means of the spatially movable master force device 11, which is also designed as permanent magnet and which may be brought closer to the magnetic elements 16, 17 to release the clamping, or which may be removed from the magnetic elements 16, 17 to let the clamping act on the measuring probe 12 without obstruction.

The magnetic field of the master force device 11 may thereby be in an advantageous manner stronger than the magnetic field of the magnetic elements 16, 17.

While the guide element 7 is hinged towards the transport module 1 for being able to shift the measuring probe 12 between the receiving area 54 and the target area 57, the measuring probe 12 remains thus unclamped at the fixing device 66 and may be shifted freely. If, however, the measuring probe 12, which has been pushed to the target area 57, is supposed to be detached together with the transport module 1 from the handling apparatus 50 and to be transported to the scanning probe microscope 81, merely the guide element 7 needs to be hinged away, whereby for the transport to the scanning probe microscope 81, the measuring probe 12 is securely clamped by means of the first fixing component 67 of the fixing device 66.

As can best be seen in FIG. 4 and FIG. 4A, the handling apparatus 50 comprises the detachable transport module 1, which comprises the target area 57. Together with a measuring probe which has been transported in a guided manner from the receiving area 54 to the target area 57 (see FIG. 1), the transport module 1 may be separated from the rest of the handling apparatus 50 and may be transported to the scanning probe microscope 81.

The ramp 3 which is depicted in FIG. 4 and FIG. 4A and which is shiftable longitudinally (see double arrow 109) and the pivotable guide element 7, which is depicted in FIG. 4 and FIG. 4A (see rotary arrow 110), are movable towards the transport module 1 for engaging with the transport module 1. This operational state is shown in FIG. 4 and FIG. 4A. If, however, the guide element 7 is hinged away from the transport module 1 by means of turning according to rotary arrow 110, and if the ramp 3 is pushed away from the transport module 1 sideways according to double arrow 109, the transport module 1 is released from the rest of the handling apparatus 50 and may then be taken out of the handling apparatus 50 and be coupled to the scanning probe microscope 81. The measuring probe 12 bears on the target area 57 of the transport module 1 after such a release, so that a user may comfortably transport the whole transport module 1, together with measuring probe 12, to the scanning probe microscope 81 and mount it there to be ready for operation. The handling of small, filigree parts by the user becomes dispensable.

Descriptively speaking, the receiving area 54 is arranged between the ramp 3 and the guide element 7 when engaging the transport module 1. The target area 57 is however arranged between the transport module 1 and the guide element 7 when engaging with the transport module 1 (see FIG. 5). As can be seen in FIG. 4A and FIG. 5, the target area 57 is inclined downwards in relation to a horizontal plane. In a corresponding manner, the receiving area 54 and/or a guide area, i.e. a ground area of the channel 59, of the guide structure 55 may also be inclined downwards towards the insertion pocket 69 in relation to a horizontal plane. Thereby, the measuring probe 12 may move downwards along a downwards inclined area during transport from the receiving area 54 in the direction of the target area 57, so that the installation of the measuring probe 12 in the transport module 1 is carried out under an angle, which corresponds to the final target position of the measuring probe 12 in the transport module 1 and in further consequence in the scanning probe microscope 81.

In FIG. 16, there is shown a locking mechanism 70 for disabling an undesired movement of component of the handling apparatus 50, which locking mechanism 70 is partially implemented in the ramp 3 and in the adjacent components 4, 2 of the handling apparatus 50. The undesired movement which is prevented by the locking mechanism 70 is one such that would expose the cantilever 52 and/or the probe tip 85 to mechanical stress during a movement of the ramp 3 relative to the adjacent components 4, 5.

The arrangement 71 according to FIG. 1 may be operated as follows.

Firstly, the measuring probe 12 which is to be transferred to the scanning probe microscope 81 may be placed at the receiving area 54 in the region between the ramp 3 and the guide element 7 of the handling apparatus 50 and may be covered by the cover device 58, which may be part of the guide element 7.

Then, the measuring probe 12 may be shifted in a guided manner from the receiving area 54 along the channel 59 of the guide element 55 in the direction of the target area 57, which is accomplished by means of the feeding pusher 62. The assembly of components 4, 5, 6 is shifted to the left according to FIG. 4. Thereby, the measuring probe 12 is inserted into the insertion pocket 69 and is now located in the region between the transport module 1 and the guide element 7.

Subsequently, the guide element 7 is hinged away from the transport module 1, whereby the fixing device 66 for fixing the measuring probe 12 in the insertion pocket 69 is activated. Then, the ramp 3 is driven away from the transport module 1. Thus, the transport module 1 is exposed for extraction out of the handling apparatus 50.

Now, the transport module 1, together with measuring probe 12 which is fixed thereto, may be taken off the rest of the handling apparatus 50 and may be coupled to the transport module interface 72 of the scanning probe microscope 81. After this coupling, the scanning probe microscope 81 may be operated for determining surface information regarding a sample body 86 by means of sensing in a scanning manner the surface of a sample body 86 by means of the measuring probe 12. Upon completion of this operation, the transport module 1, together with measuring probe 12, may be taken off the scanning probe microscope 81. Thereafter, the transport module 1, which has been taken off, together with the measuring probe 12 that is still fixed thereto, may be transferred back to the handling apparatus 50 and put down between ramp 3 and guide element 7.

Thereafter, the ramp 3 is driven to the transport module 1 and the guide element is hinged towards the transport module 1 while simultaneously releasing the clamping of the measuring probe 12. By hinging, the fixing device 66 is triggered for releasing the measuring probe 12, which has been fixed before inside the insertion pocket 69, and the transport module 1 is mounted at the handling apparatus 50.

Now, the assembly comprising the components which are marked with reference sign 4, 5, 6 in FIG. 1 may, according to FIG. 1, be moved to the left. By actuating the actuating device 6, the hook 5' of the discharge pusher 63 engages at the measuring probe 12. After that, the assembly comprising the components which are marked with reference sign 4, 5, 6 in FIG. 1 may, according to FIG. 1, be moved to the right, whereby the hook 5' of the discharge pusher 63 pushes or drags the measuring probe 12 to the right. When the measuring probe 12 reaches the receiving area 54, the release nose 5" reverses out of the recess 3', whereby the hook 5' releases the measuring probe 12 and puts it down in the region of the receiving area 54. Therefore, the measuring probe 12 is again located at its original starting position in the region between ramp 3 and the guide element 7 and may for example be extracted in a simple manner from the handling apparatus 50 by a user using tweezers or such.

In the following, the setup and the operation of the handling apparatus 50 are described in more detail.

The general setup of the handling apparatus 50 or the cantilever exchange apparatus is depicted in FIG. 4. The cantilever module or the transport module 1 is introduced into a ground plate 2 of the exchange apparatus or handling apparatus 50. On top of this ground plate 2 there is seated the ramp 3 which is arranged in a movable way and which may be locked in two stop positions by means of a two-button mechanism 10, 10'. The one stop position, which is not depicted in the figure, is that in which the transport module 1 may be inserted into the handling apparatus 50 or be extracted from it. In the other stop position, which is depicted in FIG. 5, the installation in or the extraction of the measuring probe out of the transport module 1 is enabled. The lateral guidance of the ramp 3 is accomplished by an adjustable ledge 9.

On the top side of the ramp 3, there is, also arranged in a shiftable manner (see double arrow 112), the sled 4, which receives the spring tongue 5 with the actuating device 6, which is here designed as an actuating button. The spring tongue 5 serves for the extraction of the measuring probe 12 out of the transport module 1.

The guide element 7, which may be hinged by means of a double hinge 8 from the working position on the handling apparatus 50 into the position for insertion/extraction of the transport module 1, has several functions, which are depicted in more detail in FIG. 5. Firstly, during folding into the working position by means of one or more built in magnets of the master force device 11, the above described fixing device 66 or clamping device for clamping the measuring probe 12 in the insertion pocket 69 is actuated, which essentially comprises the contact sheet 13, a measuring probe holder 14, a pressing sphere as holding force amplification element 15 as well as the magnetic elements 16, 17. In other words: during folding the guide element 7 into the working position, the clamping device is actuated in such a way, that a state, in which the measuring probe 12 is released, is turned on.

A top limitation of the channel 59 for guiding the cantilever chip, i.e. the measuring probe 12, in the guide element 7 is formed by the regions 18, wherein a notch region or an exemption 61 have the effect that the sensitive probe tip 85 does not come into contact with the guide element 7.

Another function of the guide element 7 is the fixing of the ramp 3 in working position, i.e. the ramp 3 may not be pushed back when the guide element 7 is folded in. Thereby, damage to the transport module 1 or to the measuring probe 12 is prevented.

FIG. 6 and FIG. 7 show the arrangement of the components that serve for extracting the cantilever chip or the measuring probe 12 out of the cantilever module or out of the transport module 1. The spring tongue 5 is pivotally supported in the sled 4 and may, by means of the actuating device 6, be pushed down until it reaches a stop (not depicted). For comfortable operability, the button is coupled mechanically with a snap disk 19 (see FIG. 6). In this manner, the user receives a haptic and/or acoustic feedback upon having successfully pushed down the button of the actuation device 6.

Advantageously, the spring tongue 5 of the discharge pusher 63 comprises at its bottom side a needle shaped, flexible extension or hook 5', which is formed at its frontal end as trail hook, with which it can grab the measuring probe 12 at its rear side 103. The very low stiffness of the needle results in that, when the button of the actuating device 6 is being pressed, a maximum force of less than 1N is acting on the holder 14, which is in particular called cantilever holder, or on the measuring probe 12, and thus no damage is caused.

In FIG. 7, the position in which the spring tongue 5 is pressed and already hooked, is shown in dotted lines. Hooking at the measuring probe 12 happens automatically after pressing the actuating device 6, when sled 4 is moved away from the frontal end position. Simultaneously, the release nose 5" of the spring tongue 5 sinks into a longitudinal notch or recess 3' of the measuring probe channel of the ramp 3. The release nose 5" serves to ensure that upon further pulling back of extend the sled 4, the measuring probe 12 is released and comes to rest at a defined exchange position without releasing the button of the actuating device 6, even if the sled 4 is moved further to its rear limit stop. The release of the measuring probe 12 is carried out by lifting up the flexible needle in the form of the hook 5', due to the outlet of the release nose 5" in the notch outlet area of the recess 3' of the ramp 3. Furthermore, the geometry of the hook 5' at its bottom side is configured in such a way that upon retracting the sled 4, when the button of the actuating device 6 is pressed accidentally, no damage to the holder 14 or the contact sheet 13 occurs. Thereby, the inclined surface glides over the edge of the holder 14 or of the contact sheet 13 while bending the hook 5' that is formed as an elastic needle.

With the described handling apparatus 50, a controlled guidance of the measuring probe 12 is possible, so that the measuring probe 12 is not damaged during the exchange.

The tool in the form of the handling apparatus 50 enables advantageously a predominantly form-fit guidance for the measuring probe 12 in all spatial directions. In combination with the exemptions 61 (see FIG. 9 and FIG. 12), which prevent a contact of the cantilever 52 and the probe tip 85 even when the measuring probe 12 is guided in the channel 59 by means of the pushers 62, 63, a clamping or adhesive bonding on a carrier is dispensable. The guidance of the measuring probe 12 is accomplished by means of the guide structure 55, which defines the channel 59, in which both pushers 62, 63 of the transport device 56 are received. The channel 59 is, as shown in FIG. 9, formed from two pairs of opposing guide areas, which form on the one hand the side areas and on the other hand bottom and top sides (see walls 60). The top wall 60 comprises an exemption 61, which ensures that the cantilever 52 and the probe tip 85 itself cannot be touched. Because of this design, the mobility of the measuring probe 12 is essentially limited to a shift in the longitudinal direction of the channel 59.

The frontal pusher which is formed as feeding pusher 62 touches the measuring probe 12 at the front side and is used to shift the measuring probe 12 in the longitudinal direction of the channel 59. Like the guide areas on the top side or on the top wall 60 of the channel 59, the feeding pusher 62 is provided in its center with the exemption 61 to ensure that the measuring probe 12 can be touched without damaging the cantilever 52, together with the probe tip 85 itself. The front pusher or feeding pusher 62 is employed for the task of inserting the measuring probe 12 into the clamping device, i.e. into the insertion pocket 69 with the fixing device 66 that is acting there.

When the measuring probe 12 is to be extracted again from this clamping device, the discharge pusher 63, which is formed as rear pusher, is used. This discharge pusher 63 touches the measuring probe 12 at the side of the measuring probe that is not facing the cantilever 52 together with the probe tip 85. The discharge pusher 63 may advantageously be designed narrow in a direction of the channel 59 which is perpendicular to a respective pushing direction 107, 108, because the contact sheet 13 in the clamping device is provided with a slit that is traversing it completely, to make room for the discharge pusher 63. This slit should again be as narrow as possible to be able to guide the discharge pusher 63 in a space saving manner.

Both pushers 62, 63 together limit the mobility of the probe body 51 in the longitudinal direction of the channel 59. Thus, the mobility of the measuring probe 12 is, preferably on a form-fit basis, limited so far that a contact between the cantilever 51, together with probe tip 85, and the surrounding structure is disabled and the measuring probe 12 may be moved in a safe and guided manner in a spatial direction of the longitudinal direction of the channel 59.

Following this concept, when the handling apparatus is used, the measuring probe 12 is put onto a structure in the form of the receiving area 54, which is formed as at least one of the areas of the channel 59. Thereafter, the channel 59 is completed with the cover device 58, similar to a lid. Subsequently, using the feeding pusher 63, the measuring probe is inserted into the fixing device 66 at the insertion pocket 69. In this operational state, the fixing device is unlocked.

For extraction, the fixing device 66 is —preferably, but not mandatory— unlocked and the measuring probe 12 is retracted into the channel 59 by means of the discharge pusher 59. After taking the cover device 58 off, the measuring probe 12 may be extracted.

The respective one of the pushers 62, 63 that is not needed may preferably be moved along with and parallel to the pusher 62, 63 currently in use, in order to leave no room for unwanted movements of the measuring probe 12.

In an alternative to the embodiment described before, individual boundary areas or walls 60, which form part of the channel 59 in the embodiments described before, may also be part of one or of both pushers 62, 63. For example in FIG. 8 and FIG. 14, a discharge pusher 63 can be seen, which also takes over the guidance of the top side of the measuring probe 12.

To prevent damage to the clamping device or to the fixing device 66 on the one hand and to the measuring probe 12 on the other hand, there may be implemented between the operating element (see actuating device 6), which is accessible to the user, and the pushers 62, 63, a coupling which only transfers forces of uncritical magnitude (in particular merely forces below a pre-definable threshold value. Graphically speaking, independently from a force exerted by a user (see finger 111), merely a presettable maximum value of the force is transferred at the most, so that no damage to the fine mechanics may occur. In this regard, reference is made to FIGS. 8 and 15.

In the following, a compensation of tolerances in the mechanical design between the handling apparatus 50 and a scanner of the scanning probe microscope 81 according to an exemplary embodiment is described.

To ensure the function of the handling apparatus 50 as cantilever exchange apparatus in combination with every cantilever module or transport module 1, constricted tolerances may be ensured for the handling apparatus 50 as well as for the transport module 1.

When the ramp 3 is pushed towards the transport module 1, i.e. the handling apparatus in working state, it shall be made sure that the measuring probe 12 may be pushed without canting from the channel 59 in the ramp 3 into the holder 14 at the transport module 1, and may then also be extracted from there without obstruction by protruding edges, areas, etc.

An advantageous feature in this regard is the remaining slit between the holder 14 and the ramp 3 during pushing the ramp 3 towards the transport module 1 (compare FIG. 7). If the slit is too big, there is the risk that the measuring probe 12 will cant, which may lead to damage. If nor slit remains, the ramp 3 may possibly damage the transport module 1 during pushing it closer.

For these reasons, the ramp 3 may be advantageously provided with an adjustable limit stop 20 shown in FIG. 16, which is not visible or not accessible for the operator, and which is adjusted once during assembly of the handling apparatus 50 by means of an adjustment unit. For example, the remaining slit may comprise a size of around 0.1 mm [0.00394 inch] or may be adjusted to this dimension.

The lateral alignment of the transport module relative to the handling apparatus 50 is accomplished by pushing the transport module 1 along a dovetail guidance until it hits a rear limit stop in the form of the ledge 9 at the base plate 2. The ledge 9 also takes over the exact lateral guidance of the ramp 3 when pushing it towards the transport module 1.

As a further advantageous feature, inlet areas of holder 14 and channel 59 of the ramp 3 as well as of the guide component 7 are provided with according chamfers, which prevent the measuring probe 12 from canting.

In the following, a mechanical design is described, which supports an operator of the handling apparatus 50 with an assistance for a simplified and reproducible positioning of the measuring probe 12 by means of tweezers or other auxiliary means. The exchange apparatus in the form of the handling apparatus 50 may be provided with one or more features, which enable a simple and safe operation for the operator. In FIG. 16, one of those features is depicted in detail.

To protect the measuring probe 12 itself and the transport module 1 from damage, moving the ramp 3 backwards should be avoided, when the sled 4 is in the position, from which —viewed in the insertion direction— an engagement of the parts, i.e. the feeding pusher 62 or the pushing needle (not depicted in FIG. 16) or the spring tongue 5 of the discharge pusher 63, which parts move the measuring probe 12, takes place.

An according mechanical locking of the movement of the ramp 3, dependent on the position of the sled 4, may be accomplished by means of locking bolts 21, pressure pieces 22, and springs 23. The movement of the pressure pieces 22 is accomplished by a crank region 4' of the sled 4 and has the effect, that the locking bolt 21 sinks into a bore 2' in the base plate 2 and thus fixes the ramp 3.

When the sled 4 is pushed forward from the position that is depicted in FIG. 16 (i.e. according to FIG. 16 to the left) and the measuring probe 12 is thereby moved into the transport module 1, the locking of the ramp 3 is conserved. If the sled 4 is moved in the opposite direction (i.e. according to FIG. 6 to the right), whereby the parts that move the measuring probe 12 are not engaged, the crank geometry of the crank region 4' and the force of the springs 23 have the effect, that the locking bolt 21 is pressed out of the bore 2' and the shift of the ramp 3 in the direction of the rear end position is in consequence enabled.

A further feature for the protection of the measuring probe 12 and the transport module 1 is that the transport module 1 may only be inserted into the handling apparatus 50 or extracted from it, when the ramp 3 is located at the rear end position. This feature may on the one hand be accomplished by means of the shaping of the top side of the transport module 1 and on the other hand by means of the geometry of the bottom side of that region of the ramp 3, which is located above the transport module 1 (not depicted in the figure).

According to an embodiment, the handling apparatus 50 or the exchange apparatus, may be actuated —preferably motorized—electrically, pneumatically, etc. The handling apparatus 50 may be employed separately or as extension unit of a scanning probe microscope 81.

FIG. 17 to FIG. 20 show a handling apparatus 50 according to an exemplary embodiment of the invention in different operational states during execution of a method for handling a measuring probe 12 of a scanning probe microscope 81 by means of the present handling apparatus 50.

Figure 17:
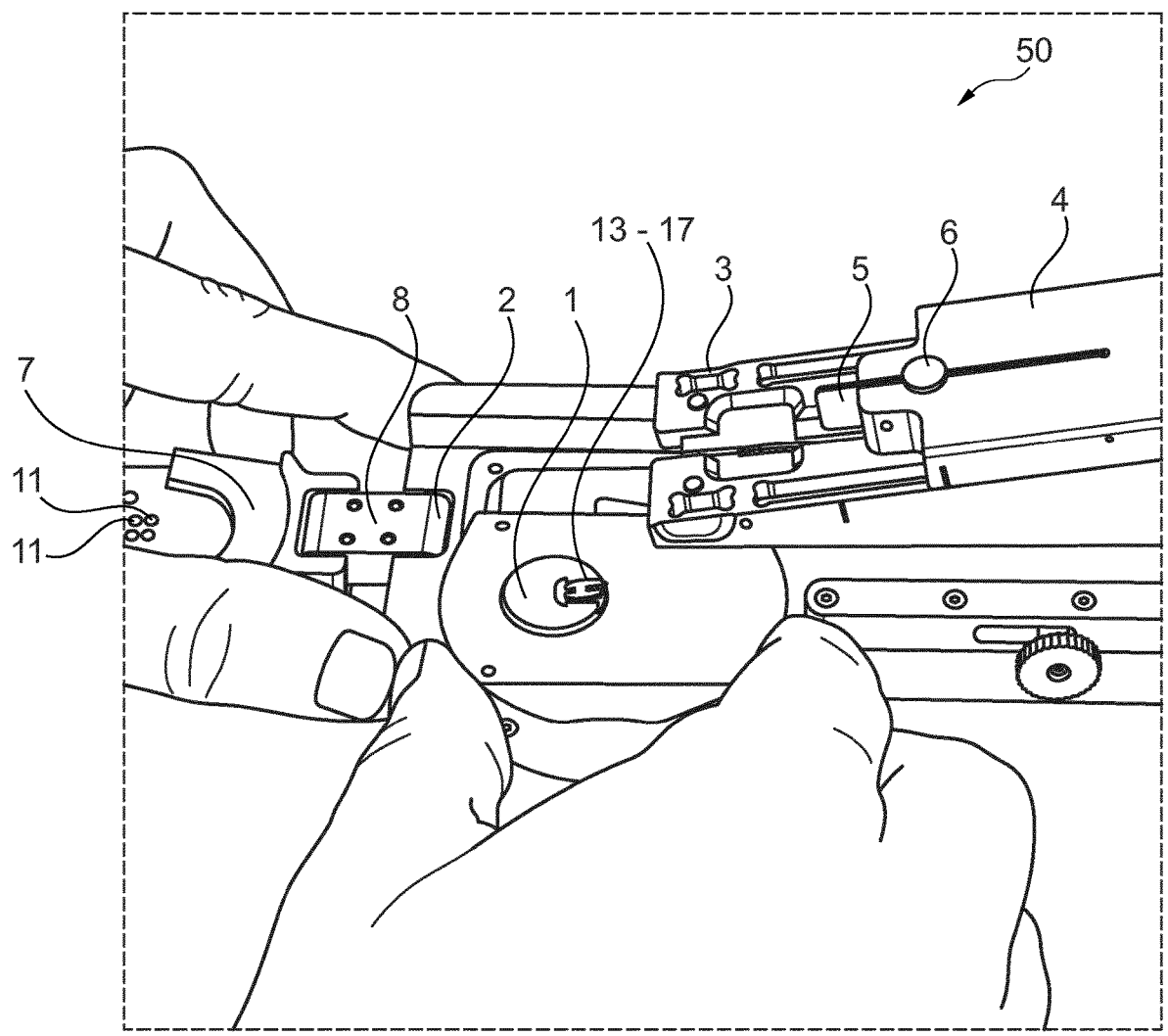
FIG. 17, FIG. 18, FIG. 19 and FIG. 20 show a handling apparatus according to an exemplary embodiment of the invention in different operational states during an execution of a method for handling a measuring probe of a scanning probe microscope by means of the shown handling apparatus.

FIG. 17 shows how a user has hinged away the guide component 7 and pushed back the ramp 3 and how a user inserts the transport module 1 into the handling apparatus 50.

Figure 18:
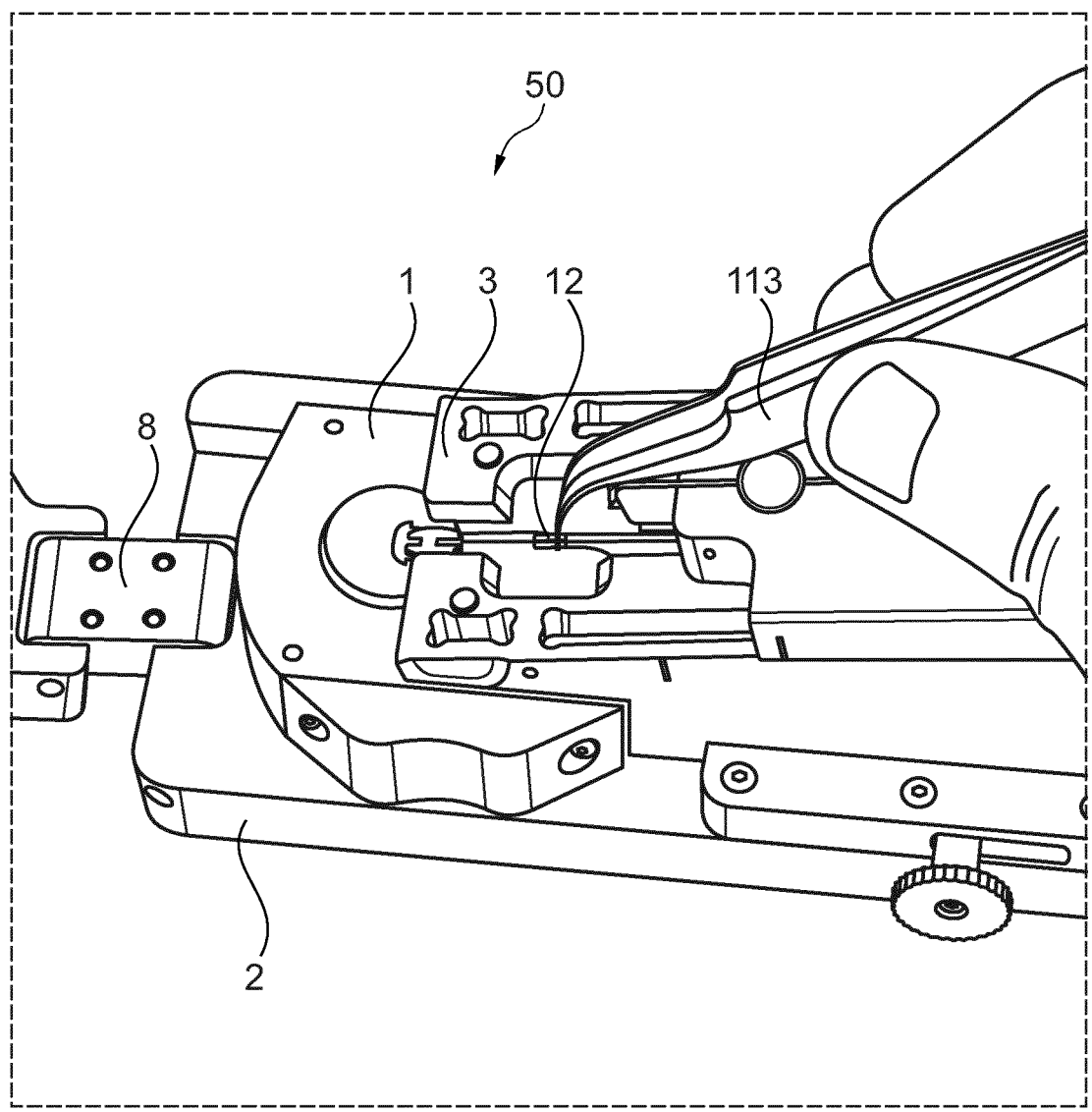

FIG. 18 shows how a user puts a measuring probe 12, which has been picked with tweezers 113, onto a receiving area 54 of the handling apparatus 50.

Figure 19:
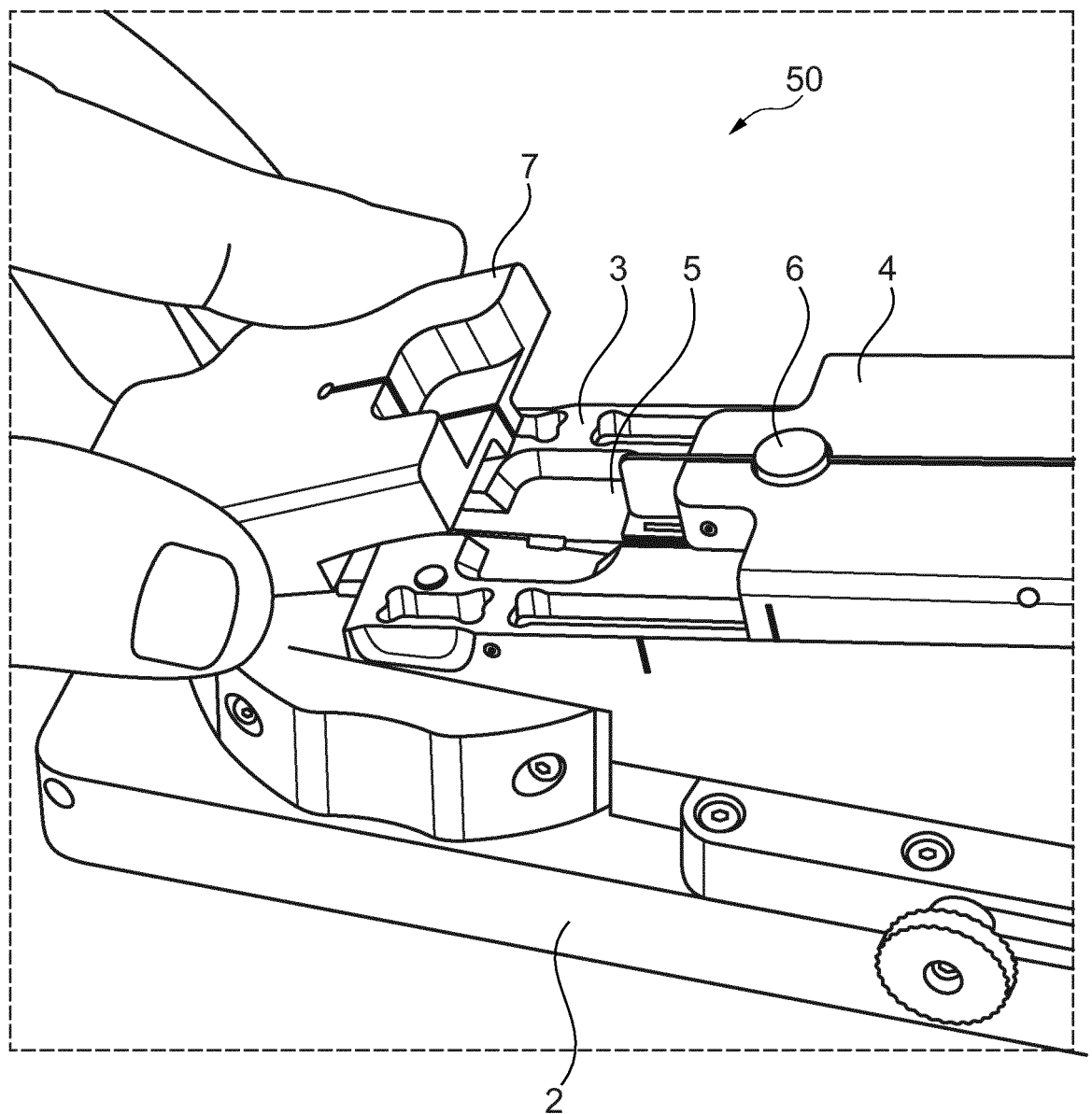

FIG. 19 shows how a user has pushed the ramp 3 towards the transport module 1 and how a user unfolds the guide component 7 onto the transport module 1. Subsequently, the sled 4 may be driven from the left to the right, and back. Thereby, inside the handling apparatus 50, as described in more detail above, the measuring probe 12 is moved by means of the guide structure 55 and the transport device 56 as well as by the fixing device 66 to the target area 57 on the transport module 1.

Figure 20:
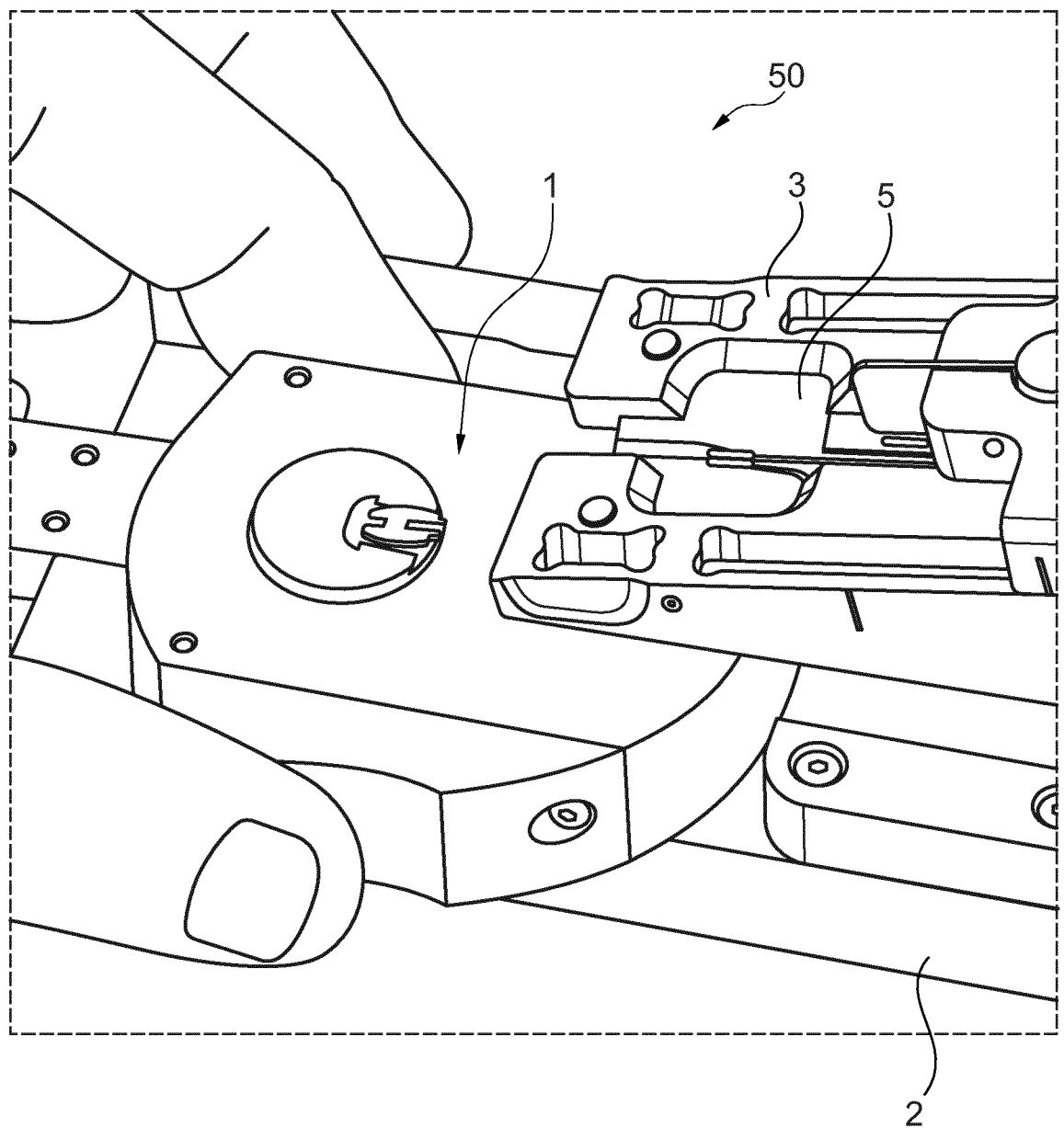

FIG. 20 shows how a user subsequently hinges away the guide component 7 and how a user has driven away the ramp 3 from the transport module 1. The transport module 1 with the measuring probe 12, fixed thereto in a clamping manner, may now be extracted out of the handling apparatus 50 as a whole and may be transferred to a scanning probe microscope 81.

It should be noted that the term "comprising" does not exclude other elements or steps and the use of articles "a" or "an" does not exclude a plurality. Further, it should also be noted, that features or steps, which have been described with reference to one of the above embodiments, may also be used in combination with other features or steps of other embodiments described above.

The invention claimed is:

1. A handling apparatus for handling a measuring probe of a scanning probe microscope, the measuring probe comprising:
   a probe body and a probe tip which is coupled with the probe body by a cantilever, wherein the handling apparatus comprises:
   a receiving device for receiving the measuring probe at a receiving area;
   a guide structure, in which the measuring probe is guidable while at the same time the probe body is at least partially limited and the cantilever and the probe tip are supported without contact; and
   a transport device for transporting the measuring probe from the receiving area along the guide structure to a target area;
   wherein the transport device further comprises at least one of the following features:
   a feeding pusher for pushing the measuring probe at least in sections from the receiving area to the target area;
   a discharge pusher for pushing the measuring probe at least in sections from the target area back to the receiving area.

2. The handling apparatus according to claim 1, wherein the handling apparatus comprises at least one of the following features:

(A) the handling apparatus comprising a cover device for placing on the receiving device to cover the measuring probe, (B) the guide structure comprises a channel at least in sections between the receiving area and the target area, along which channel the measuring probe is guidable, wherein in particular (B I) the channel is delimited by top and/or bottom and/or lateral walls,
wherein further in particular (B II) a wall facing the probe tip comprises an exemption for releasing the cantilever and the probe tip in a contactless manner.

3. The handling apparatus according to claim 1, wherein the transport device for transporting the measuring probe is formed from the target area along the guide structure and back to the receiving area.

4. The handling apparatus according to claim 1, wherein the feeding pusher comprises an exemption for releasing the cantilever and the probe tip in a contactless manner, when the measuring probe is pushed by the feeding pusher at least in sections from the receiving area to the target area.

5. The handling apparatus according to claim 1, wherein the discharge pusher comprises at least one of the following features:

(A) the discharge pusher is formed merely to act on the probe body of the measuring probe, when the measuring probe is pushed back by means of the discharge pusher at least in sections from the target area to the receiving area;

(B) the discharge pusher comprises a spring tongue;

(C) the discharge pusher comprises a hook which acts on the measuring probe during the pushing, and a release nose, which is coupled with the hook and which sinks into a recess upon pushing, which release nose is guided out of the recess as a result of the pushing when the receiving area is reached by the measuring probe, whereby the hook releases the measuring probe;

(D) wherein, perpendicular to a pushing direction, the discharge pusher is formed narrower than the feeding pusher.

6. The handling apparatus according to claim 1, further comprising:

an actuating device for actuating the transport device by a user or by a drive device, in particular a motor, wherein, in particular, the handling apparatus comprises at least one of the following features:

(A) the actuating device comprises a force limitation mechanism for limiting a force being exertable by a user to the actuating device in such a way that a force being exerted on the transport device does not exceed a pre-definable threshold value;

(B) the actuating device is formed in such a way that a shifting of the transport device by actuating the actuating device can selectively be enabled or disabled.

7. The handling apparatus according to claim 1, further comprising:

a transport module comprising the target area, which transport module, in particular together with a measuring probe at the target area, is separable from the rest of the handling apparatus and transportable to the scanning probe microscope, wherein, in particular the handling apparatus comprises a movable ramp and a movable guide component, which are movable towards the transport module for engaging the transport module and are movable away from the transport module, thereby releasing the transport module, wherein, further in particular, the handling apparatus comprises at least one of the following features:

(A) the receiving area is arranged between the ramp and the guide component upon engaging the transport module;

(B) the target area is arranged between the transport module and the guide component upon engaging the transport module.

8. The handling apparatus according to claim 1, further comprising:

a fixing device for selectively fixing the measuring probe to the target area.

9. The handling apparatus according to claim 8, wherein the fixing device comprises:

a first fixing component in the region of the target area; and a second fixing component, which is formed to be selectively movable away from the target area or movable towards the target area for switching between a state where the measuring probe is fixed to the target area and a state where the measuring probe is detached from the target area;

wherein the fixing device is configured so that by moving closer the second fixing component, the state where the measuring probe is detached from the target area is turned on.

10. The handling apparatus according to claim 9, wherein the fixing device is configured so that by moving away the second fixing component the state where the measuring probe is fixed to the target area is turned on.

11. The handling apparatus according to claim 8, wherein the fixing device comprises:

a master three device for selectively exerting a master force on a fixing mechanism;

the fixing mechanism, that is operable by the master force device for detaching and/or fixing the measuring probe that has been transported to the target area;

wherein, in particular, the handling apparatus comprises at least one of the following features:

(A) the master force device is selected from a group consisting of a master force device for exerting a magnetic master force, in particular exertable by a movable master force permanent magnet or by an electrically activatable master force electromagnet, a hydraulic master force, a pneumatic master force, an electric master force, a thermal master force, and a mechanical master force;

(B) the fixing mechanism comprises at least two magnet elements, whose magnetic interaction force is formed to fix the measuring probe which was transported to the target area, in particular in a clamping manner.

12. The handling apparatus according to claim 8, wherein the fixing device comprises a holding force amplification element with a curved, in particular spherically curved, adhesive force transfer area, which, in a state where the measuring probe has been transported by the adhesive force transfer area to the target area, in particular in a punctiform manner, acts directly on the measuring device.

13. The handling apparatus according to claim 8, wherein the transport device and the fixing device are configured for cooperating in such a way that the measuring probe is first transported to the target area and is fixed not until being fixed to the target area, in particular is not pressed against the target area by forming a physical contact until being fixed.

14. The handling apparatus according to claim 1, wherein the handling apparatus comprises at least one of the following features:
(A) an insertion pocket, which is limited in sections by the target area, in which insertion pocket the measuring probe is at least partially inserted, when the measuring probe bears on the target area;
(B) at least one area from the group consisting of
the receiving area,
a guide area of the guide structure, and
the target area,
is formed as an area which is tilted in relation to a horizontal plane, in particular in such a way, that the measuring probe moves at least in sections downward along the tilted area while being transported from the receiving area to the target area;
(C) the handling apparatus comprises a locking mechanism for disabling a movement of at least one component of the handling apparatus, which movement would impinge a mechanical strain on the cantilever and/or the probe tip and/or the insertion pocket.

15. An arrangement, comprising:
a scanning probe microscope for determining surface information regarding a sample body by sensing a surface of the sample body in a scanning manner, wherein the scanning probe microscope comprises
a measuring probe, which is configured for sensing the surface of the sample body in a scanning manner and
a probe body and
a probe tip which is coupled with the probe body by a cantilever;
a handling apparatus for handling the measuring probe of the scanning probe microscope, wherein the measuring probe comprises the probe body and the probe tip which is coupled with the probe body by means of the cantilever, wherein the handling apparatus comprises:
a receiving device for receiving the measuring probe at a receiving area;
a guide structure, in which the measuring probe is guidable while at the same time the probe body is at least partially limited, and the cantilever and the probe tip are supported without contact;
a transport device for transporting the measuring probe from the receiving area along the guide structure to a target area;
wherein the transport device further comprises at least one of the following features:
a feeding pusher for pushing the measuring probe at least n sections from the receiving area to the target area:
a discharge pusher for pushing the measuring probe at least in sections from the target area back to the receiving area.

16. The arrangement according to claim 15, wherein the scanning probe microscope comprises at least one of the following features:
(A) a transport module interface for coupling a transport module in such a way that, after coupling the transport module to the transport module interface, the measuring probe at the transport module is operational for sensing in a scanning manner the surface of the sample body;
(B) the scanning probe microscope is formed as a scanning force microscope.

17. A method for handling a measuring probe for a scanning probe microscope, wherein the measuring probe comprises a probe body and a probe tip which is coupled with the probe body by a cantilever, the method comprising:
receiving the measuring probe at a receiving area of a handling apparatus;
guiding the measuring probe in the handling apparatus in such a way that the probe body is at least partially limited by a guide structure and the cantilever and the probe tip are supported without contact in the guide structure;
transporting the measuring probe in the handling apparatus from the receiving area along the guide structure to a target area; and
wherein the method further comprises at least one of the following features:
pushing the measuring probe at least in sections from the receiving area to the target area using a feeding pusher;
pushing the measuring probe at least in sections from the target area back to the receiving area using a discharge pusher.

18. The method according to claim 17, wherein, after transporting, the method comprises:
separating, together with the measuring probe, a transport module comprising the target area from the rest of the handling apparatus; and
coupling the transport module together with the measuring probe located at the target area to the scanning probe microscope, wherein, in particular after the coupling, the method comprises operating the scanning probe microscope for determining surface information regarding a sample body by sensing in a scanning manner the surface of a sample body by means of the measuring probe.

19. The method according to claim 18, wherein the method further comprises:
separating the transport module together with the measuring probe from the scanning probe microscope; and
re-coupling the transport module together with the measuring probe to the handling apparatus, wherein, in particular, the method further comprises
transporting the measuring probe in the handling apparatus from the target area along the guide structure back to the receiving area.

20. A handling apparatus for handling a measuring probe of a scanning probe microscope, the measuring probe comprising:
a probe body and a probe tip which is coupled with the probe body by a cantilever, wherein the handling apparatus comprises:
a receiving device for receiving the measuring probe at a receiving area;
a guide structure, in which the measuring probe is guidable while at the same time the probe body is at least partially limited and the cantilever and the probe tip are supported without contact;
a transport device for transporting the measuring probe from the receiving area along the guide structure to a target area; and
a transport module comprising the target area, which transport module is separable from the rest of the handling apparatus and transportable to the scanning probe microscope.

* * * * *